(12) United States Patent
Palazzolo et al.

(10) Patent No.: US 9,930,998 B2
(45) Date of Patent: Apr. 3, 2018

(54) MAGNETIC SINK ACCESSORY SYSTEM

(71) Applicant: Elkay Manufacturing Company, Oak Brook, IL (US)

(72) Inventors: Salvatore Palazzolo, Homer Glen, IL (US); Raymond T. Hecker, Elmhurst, IL (US)

(73) Assignee: Elkay Manufacturing Company, Oak Brook, IL (US)

( * ) Notice: Subject to any disclaimer, the term of this patent is extended or adjusted under 35 U.S.C. 154(b) by 0 days.

(21) Appl. No.: 15/593,889

(22) Filed: May 12, 2017

(65) Prior Publication Data

US 2017/0245693 A1 Aug. 31, 2017

Related U.S. Application Data

(62) Division of application No. 14/627,530, filed on Feb. 20, 2015.

(60) Provisional application No. 61/942,463, filed on Feb. 20, 2014.

(51) Int. Cl.
*A47J 47/20* (2006.01)
*E03C 1/18* (2006.01)

(52) U.S. Cl.
CPC .............. *A47J 47/20* (2013.01); *E03C 1/18* (2013.01)

(58) Field of Classification Search
CPC .............. A47J 47/20; A47K 1/09; A47K 1/08
USPC ......... 4/619–660; 211/DIG. 1; 248/683, 467, 248/537, 206.5, 309.4
See application file for complete search history.

(56) References Cited

U.S. PATENT DOCUMENTS

| 428,783 A | 5/1890 | Reubel et al. |
| 502,654 A | 8/1893 | Brothwell et al. |
| 502,659 A | 8/1893 | Day |
| 584,380 A | 6/1897 | Loveless |
| 924,248 A | 6/1909 | Lazear |
| 1,229,874 A | 6/1917 | Boye |
| 1,391,599 A | 9/1921 | Wood |
| 1,403,333 A | 1/1922 | McGhee |
| 1,424,337 A | 8/1922 | Boye |
| 1,453,748 A | 5/1923 | Carlson |
| 1,504,825 A | 8/1924 | Larsen |

(Continued)

FOREIGN PATENT DOCUMENTS

| CA | 2 289 996 A1 | 5/2001 |
| DE | 201 01 822 U1 | 6/2001 |

(Continued)

*Primary Examiner* — Erin Deery
(74) *Attorney, Agent, or Firm* — Leydig, Voit & Mayer, Ltd.

(57) ABSTRACT

A magnetic sink accessory system for use with a sink having interior and exterior surfaces. The magnetic sink accessory system includes a ferromagnetic accessory belt configured to be disposed at least partially surrounding the exterior surface of the sink. The accessory belt includes an elongate flexible band and a plurality of ferritic metal pieces disposed in spaced relation along at least a portion of the flexible band so as to allow for the accessory belt to conform to contours of the exterior surface of the sink. The system includes a magnetic accessory attachment device including a body and a magnet disposed within the body such that when the body is placed near the interior surface of the sink in the vicinity of the ferromagnetic accessory belt, the magnet draws the body against the interior surface of the sink due to a magnetic attraction between the magnet and the accessory belt.

15 Claims, 31 Drawing Sheets

(56) References Cited

U.S. PATENT DOCUMENTS

| | | |
|---|---|---|
| 2,212,326 A | 8/1940 | Piken |
| 2,617,537 A | 11/1952 | Henley |
| 2,637,446 A | 5/1953 | Spangler |
| 2,639,930 A | 5/1953 | Thornton |
| 2,977,082 A | 3/1961 | Harris |
| 3,000,016 A | 9/1961 | Ridge |
| 3,020,562 A | 2/1962 | Reynolds |
| 3,023,991 A | 3/1962 | Fisher |
| 3,034,140 A | 5/1962 | Reynolds |
| 3,107,361 A | 10/1963 | Glutting, Sr. |
| 3,169,743 A | 2/1965 | Page, Jr. |
| 3,365,684 A | 1/1968 | Stemke |
| 3,382,507 A | 5/1968 | Micheau |
| 3,642,122 A | 2/1972 | Von Ende |
| 3,782,799 A | 1/1974 | Hansen |
| 3,827,020 A | 7/1974 | Okamoto |
| 4,058,335 A | 11/1977 | Abe |
| 4,100,684 A | 7/1978 | Berger |
| 4,465,198 A | 8/1984 | Martin |
| 4,678,150 A | 7/1987 | Newman et al. |
| 4,884,714 A | 12/1989 | Bechtel |
| 5,217,123 A | 6/1993 | Riley et al. |
| 5,367,278 A | 11/1994 | Yoshikawa |
| 5,746,329 A | 5/1998 | Rondeau |
| 6,338,171 B1 | 1/2002 | Dandridge |
| 6,502,794 B1 | 1/2003 | Ting |
| 6,688,479 B2 | 2/2004 | Nei |
| 7,243,806 B2 | 7/2007 | Kwok |
| 2002/0088909 A1 | 7/2002 | Chen |
| 2005/0156085 A1 | 7/2005 | Radovan |
| 2006/0026748 A1 | 2/2006 | Kwok |
| 2006/0201894 A1 | 9/2006 | Wood et al. |
| 2007/0040081 A1 | 2/2007 | Dietz |
| 2008/0210835 A1 | 9/2008 | Bagnall |
| 2009/0211017 A1 | 8/2009 | Bowden et al. |
| 2009/0314730 A1 | 12/2009 | Mansikkamaa |
| 2010/0072147 A1 | 3/2010 | Reenberg et al. |
| 2010/0148896 A1 | 6/2010 | Hugo |
| 2010/0275367 A1 | 11/2010 | Bager et al. |
| 2012/0240330 A1 | 9/2012 | Fulford et al. |
| 2013/0032648 A1 | 2/2013 | Lee |
| 2015/0012058 A1 | 1/2015 | Crawford et al. |

FOREIGN PATENT DOCUMENTS

| | | |
|---|---|---|
| DE | 20 2004 006 864 U1 | 8/2004 |
| DE | 20 2004 016 497 U1 | 12/2004 |
| DE | 10 2008 049 794 A1 | 4/2010 |
| JP | 7-213444 A | 8/1995 |
| JP | 8-68089 A | 8/1996 |
| JP | 9313366 A | 12/1997 |
| JP | 10-243888 A | 9/1998 |
| JP | 10-295607 A | 11/1998 |
| JP | 2002-315681 A | 10/2002 |
| JP | 2006-116256 A | 5/2006 |
| JP | 2006-141491 A | 6/2006 |
| JP | 2007-68828 A | 3/2007 |
| WO | WO 2007/144450 A1 | 12/2007 |

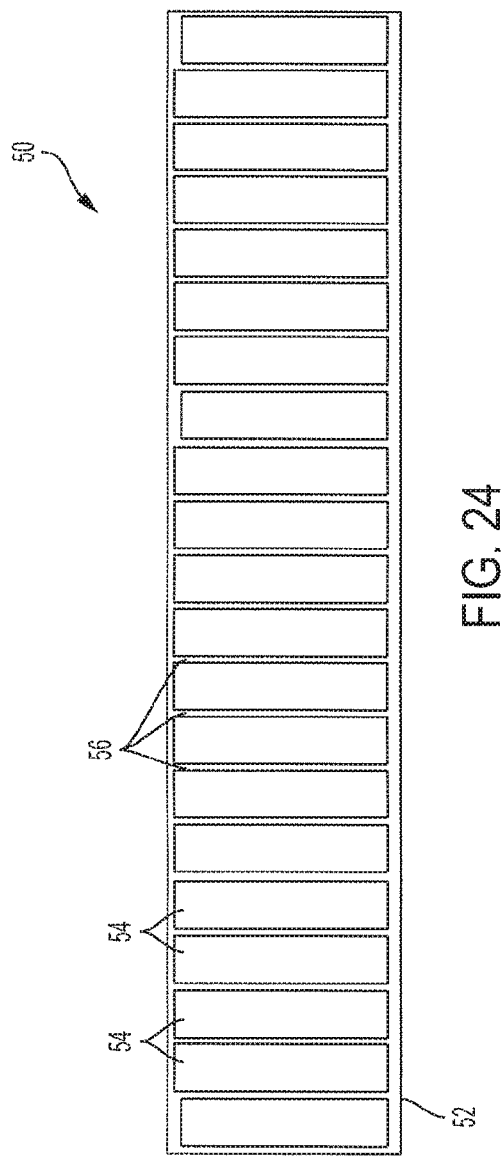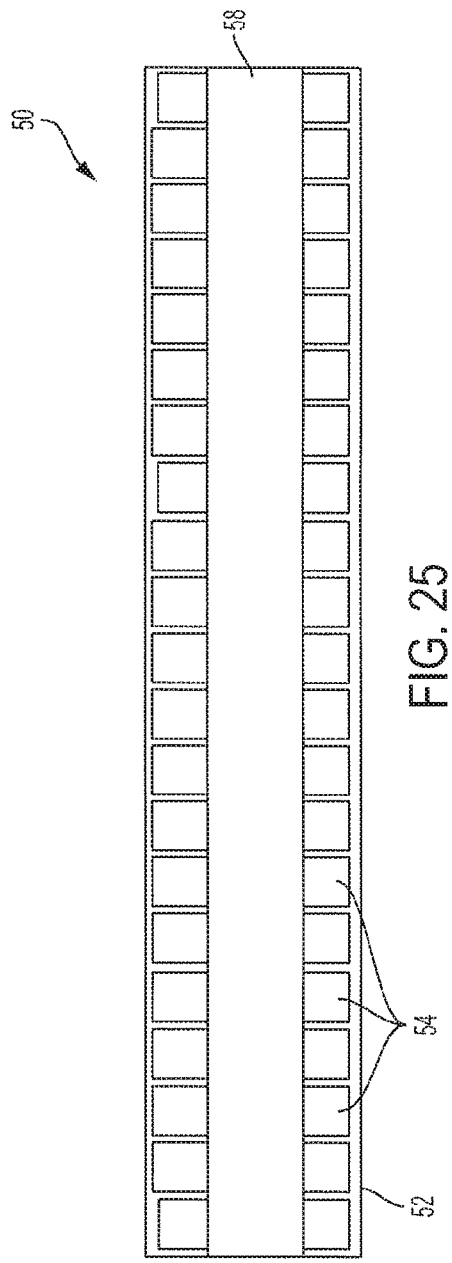

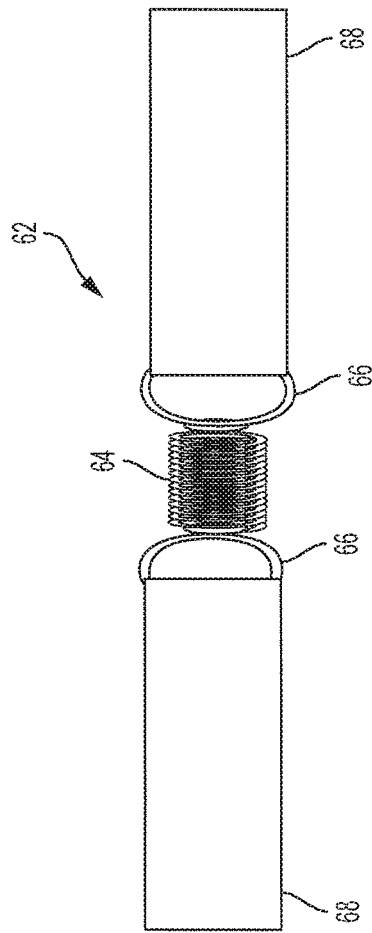
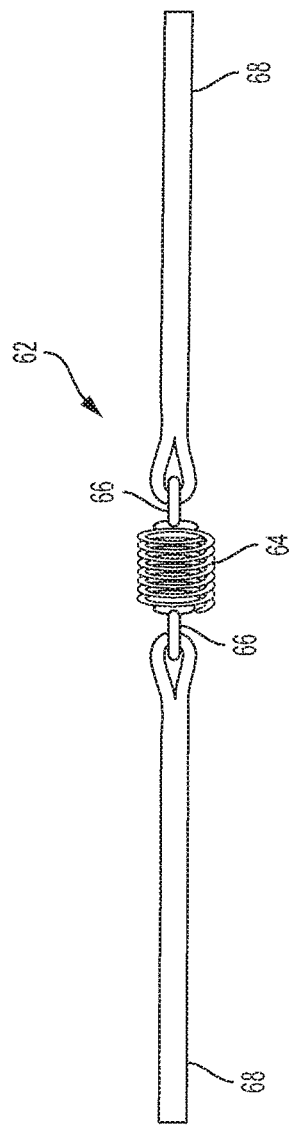
FIG. 29
FIG. 30

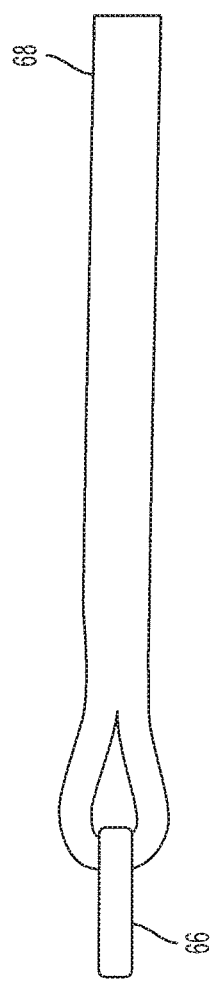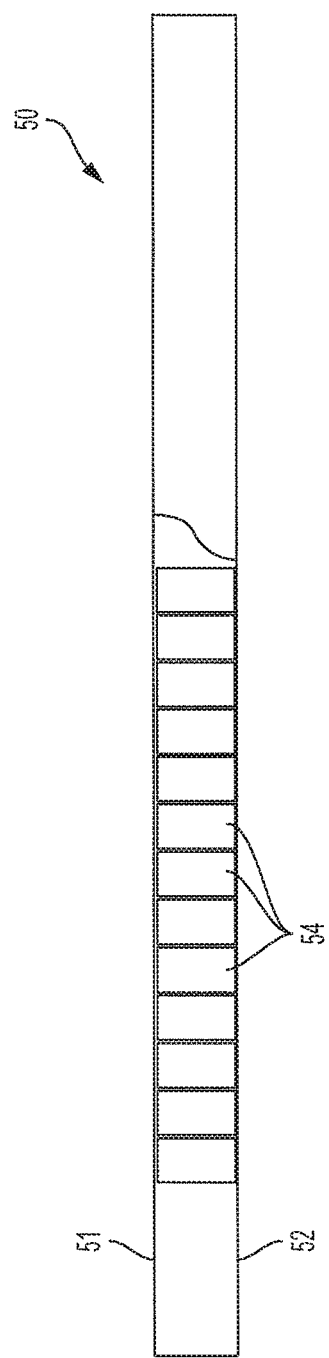
FIG. 31
FIG. 32

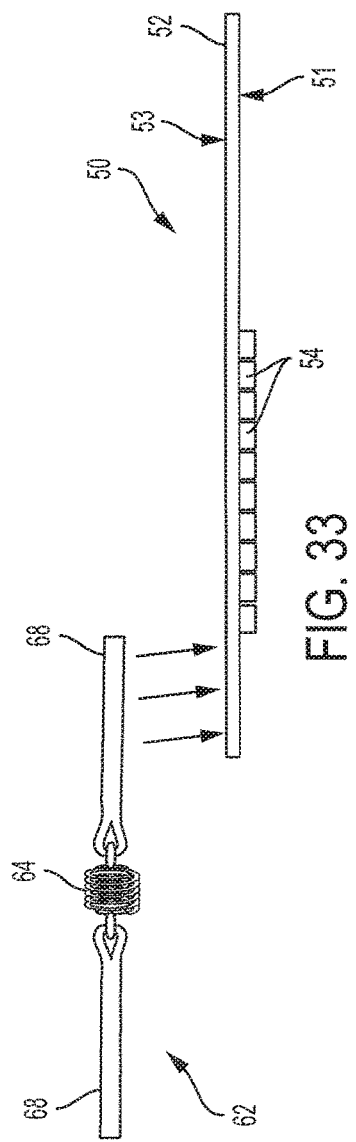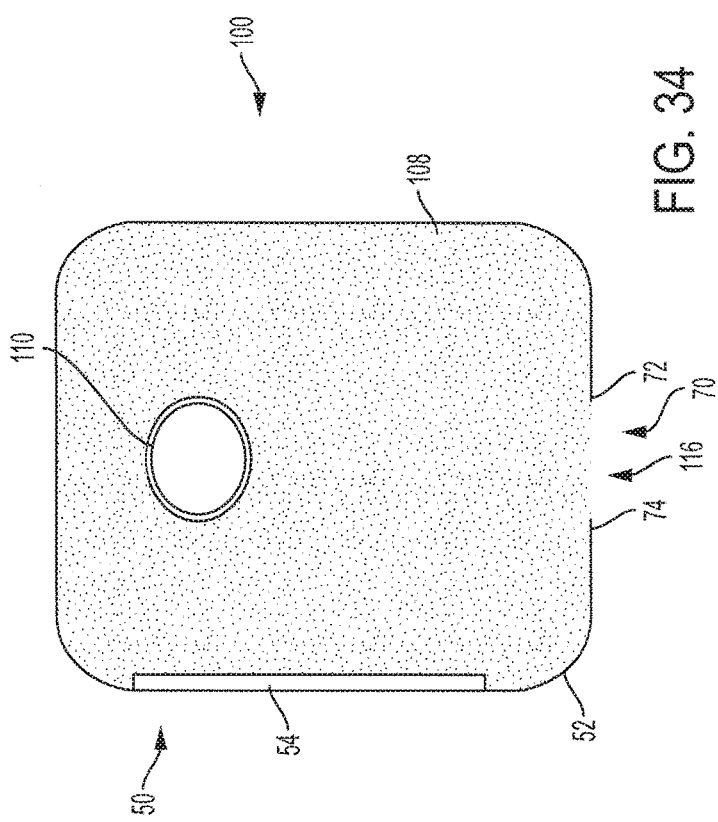
FIG. 33
FIG. 34

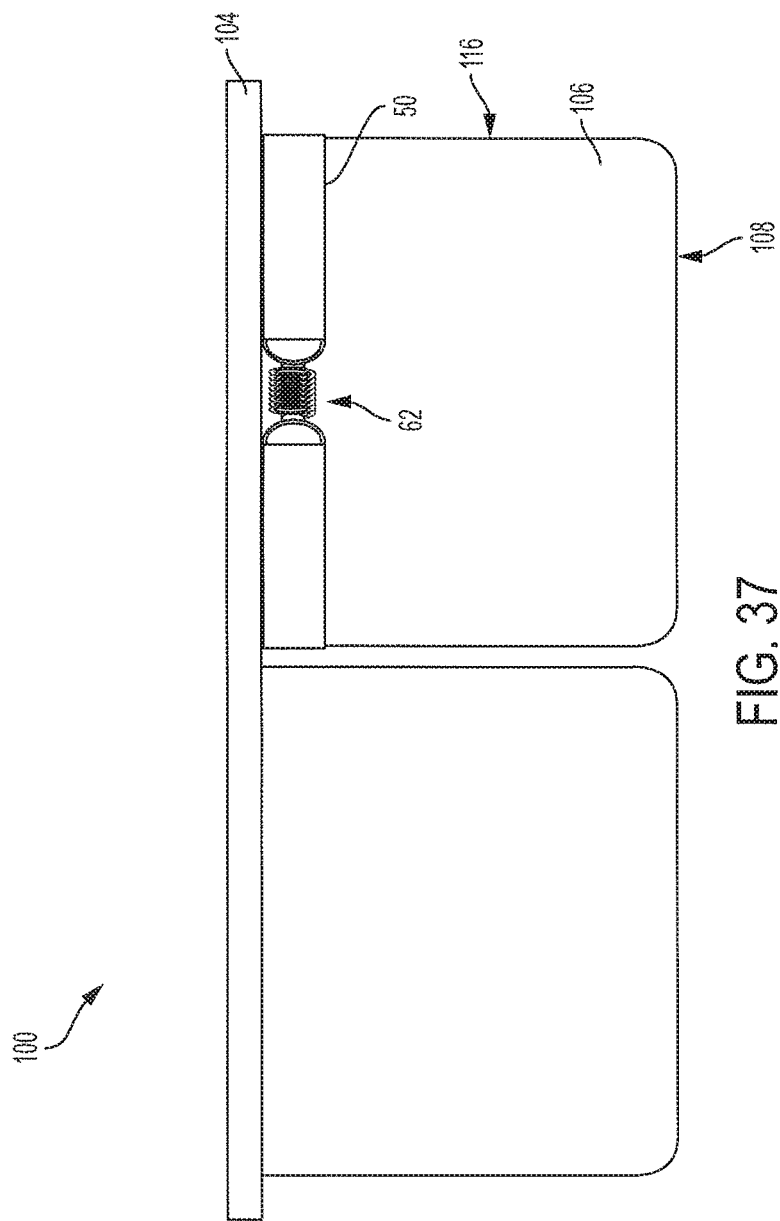

MAGNETIC SINK ACCESSORY SYSTEM

CROSS-REFERENCE TO RELATED APPLICATIONS

This patent application is a division of U.S. patent application Ser. No. 14/627,530, filed Feb. 20, 2015, which claims the benefit of U.S. Provisional Patent Application No. 61/942,463, filed Feb. 20, 2014.

FIELD

This patent disclosure related generally to accessories for sinks and, more particularly, to magnetic sink accessories.

BACKGROUND

In connection with many tasks related to the use of sinks, it is common to have various items such as soap, rags, drain stoppers, etc., disposed in and around the sink. Typically, these items rest in an unorganized manner near the sink or in the sink basin so as to be inconvenient to the sink user. Further, storing or otherwise placing soiled items in areas outside the sink is aesthetically displeasing and can soil those areas.

U.S. Patent Application Publication No. 2012/0240330 ("the '330 application") describes an example of a system for magnetically attaching accessories for a sink. The arrangement described in the '330 application, however, is only suitable when a magnetic body is dispose near non-magnetized ferromagnetic material of the sink.

SUMMARY

In an embodiment, the disclosure describes a magnetic sink accessory system for use with a sink having interior and exterior surfaces. The magnetic sink accessory system comprises a ferromagnetic accessory belt configured to be disposed at least partially surrounding the exterior surface of the sink. The accessory belt includes an elongate flexible band and a plurality of ferritic metal pieces disposed in spaced relation along at least a portion of the flexible band so as to allow for the accessory belt to conform to contours of the exterior surface of the sink. The magnetic sink accessory system includes a magnetic accessory attachment device that includes a body and a magnet disposed within the body such that when the body is placed near the interior surface of the sink in the vicinity of the ferromagnetic accessory belt, the magnet draws the body against the interior surface of the sink due to a magnetic attraction between the magnet and the accessory belt.

In another embodiment, the disclosure describes a ferromagnetic accessory belt for use with a sink having interior and exterior surfaces. The ferromagnetic accessory belt comprises an elongate flexible band configured to be disposed at least partially surrounding the exterior surface of the sink. The accessory belt also includes a plurality of ferritic metal pieces disposed along at least a portion of the flexible band. The flexible band forms a connection between adjacent metal pieces. The plurality of ferritic metal pieces are disposed in spaced relation to one another so as to allow the flexible band to conform to contours of the exterior surface of the sink. Additionally, the plurality of ferritic metal pieces are configured to provide a magnetic attraction to a magnetic accessory attachment device disposed along the interior surface of the sink.

In another embodiment, the disclosure describes a magnetic sink accessory system for use with a sink having interior and exterior surfaces. The magnetic sink accessory system comprises a ferromagnetic accessory belt configured to be disposed at least partially surrounding the exterior surface of the sink. The accessory belt includes an elongate flexible band and a plurality of ferritic metal pieces disposed in spaced relation along at least a portion of the flexible band so as to allow for the accessory belt to conform to contours of the exterior surface of the sink. The magnetic sink accessory system includes an adhesive strip having a first adhesive side adhered to at least one of the flexible band or the plurality of metal pieces, and a second adhesive side configured to adhere to the exterior surface of the sink so as to secure the accessory belt to the sink. The magnetic sink accessory system includes a covering tape adhered to the accessory belt so as to overlap the accessory belt. The covering tape is configured to secure the accessory belt to the exterior surface of the sink. The magnetic sink accessory system also includes a magnetic accessory attachment device that includes a body and a magnet disposed within the body such that when the body is placed near the interior surface of the sink in the vicinity of the ferromagnetic accessory belt, the magnet draws the body against the interior surface of the sink due to a magnetic attraction between the magnet and the accessory belt.

BRIEF DESCRIPTION OF THE DRAWINGS

FIG. 24 is a front view of an embodiment of a ferromagnetic accessory belt as disclosed herein;

FIG. 25 is another front view of another embodiment of the ferromagnetic accessory belt of FIG. 24;

FIG. 29 is front view of a tension spring assembly as disclosed herein;

FIG. 30 is a top view of the tension spring assembly of FIG. 29;

FIG. 31 is a partial top view of the tension spring assembly of FIG. 29;

FIG. 32 is a partial front view of another embodiment of a ferromagnetic accessory belt as disclosed herein;

FIG. 33 is a partial top view of the tension spring assembly of FIG. 29 and the ferromagnetic accessory belt of FIG. 32;

FIG. 34 is a bottom view of the ferromagnetic accessory belt of FIG. 32 installed on a sink;

FIG. 37 is a front view of the ferromagnetic accessory belt of FIG. 32 installed on a sink with the tension spring assembly of FIG. 29.

DETAILED DESCRIPTION

Figure 1:
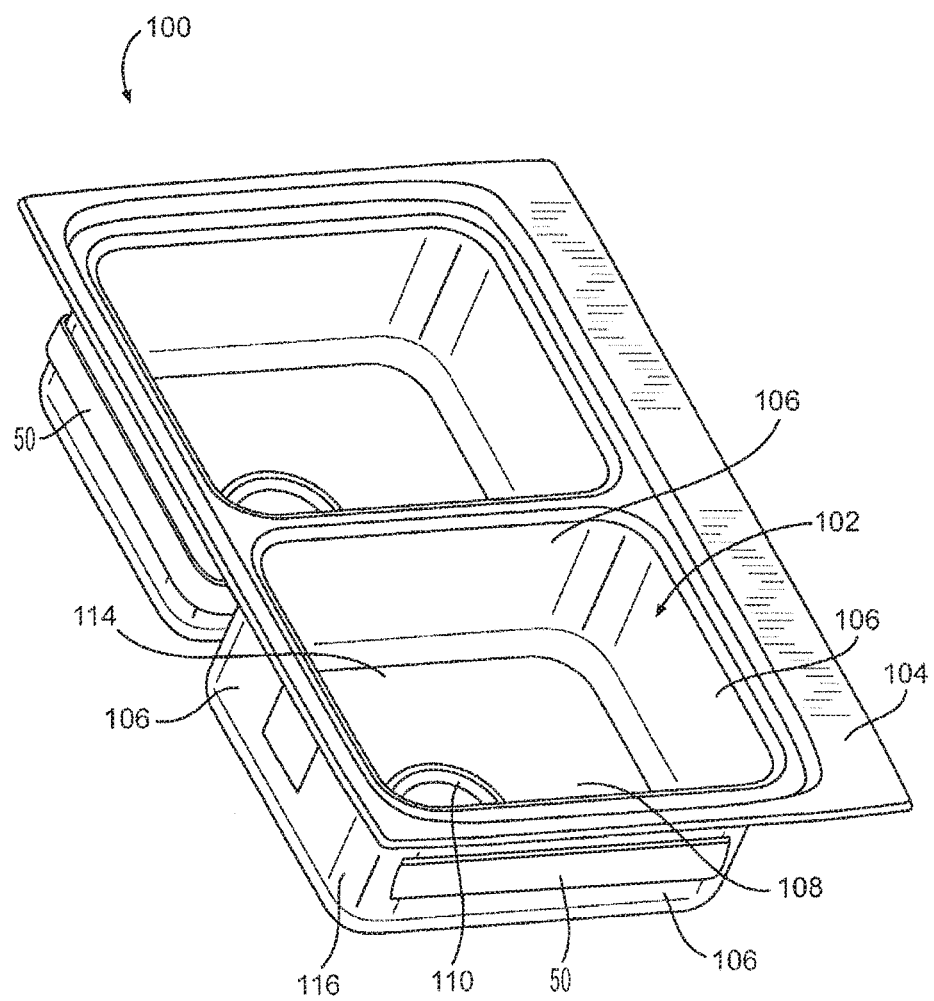
FIG. 1 is a perspective view of a sink with a ferromagnetic accessory belt installed thereon in accordance with the disclosure.
Figure 2:
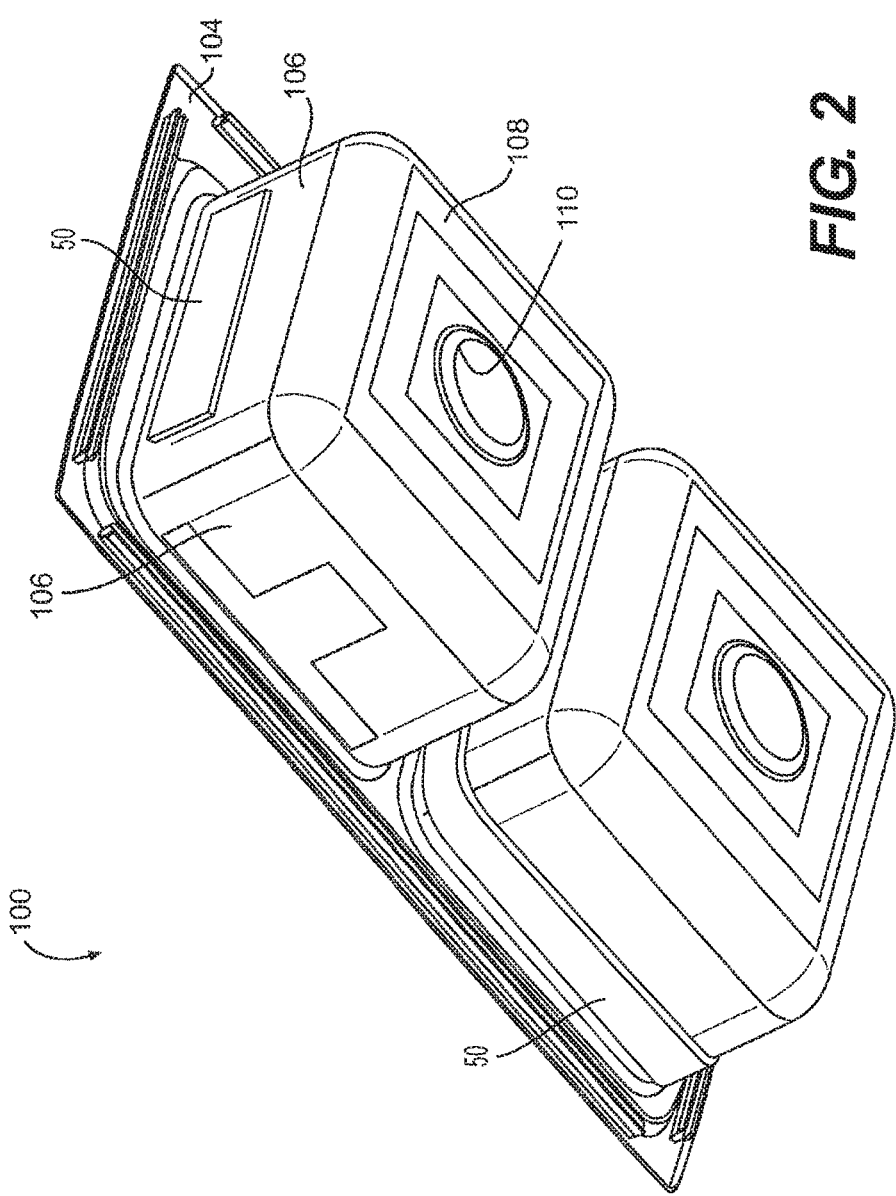
FIG. 2 is another perspective view of the sink of FIG. 1.
Figure 3:
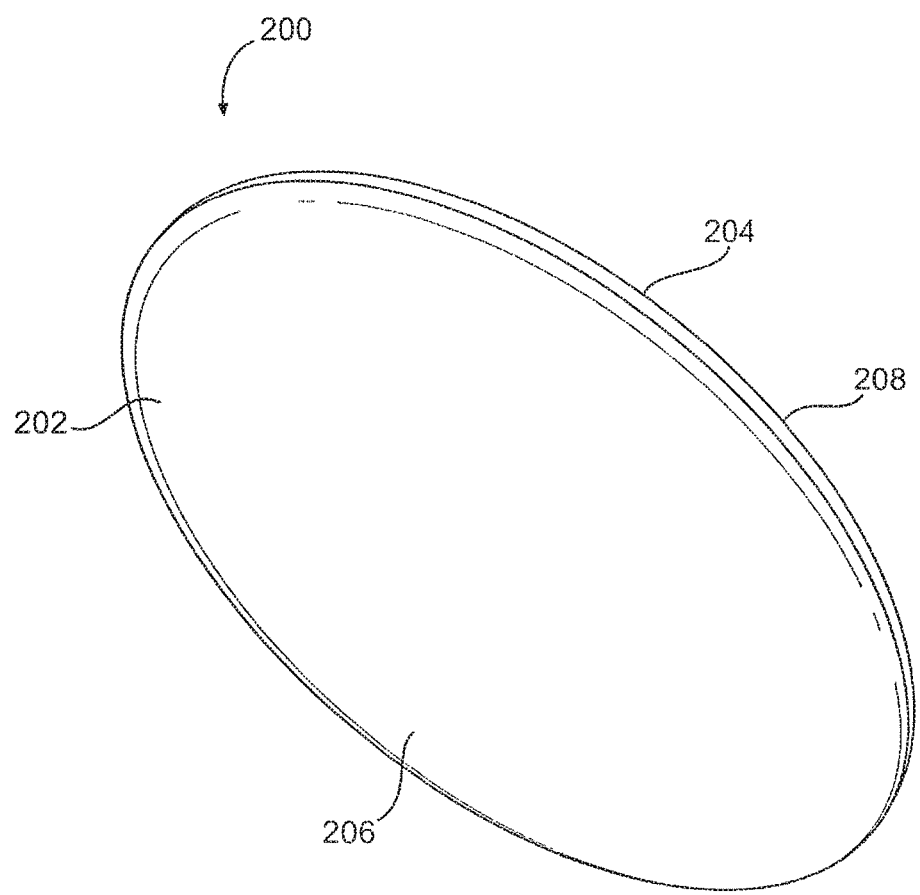
FIG. 3 is a perspective view of a magnetic accessory attachment device suitable for use with the sink of FIG. 1 in accordance with the disclosure.
Figure 4:
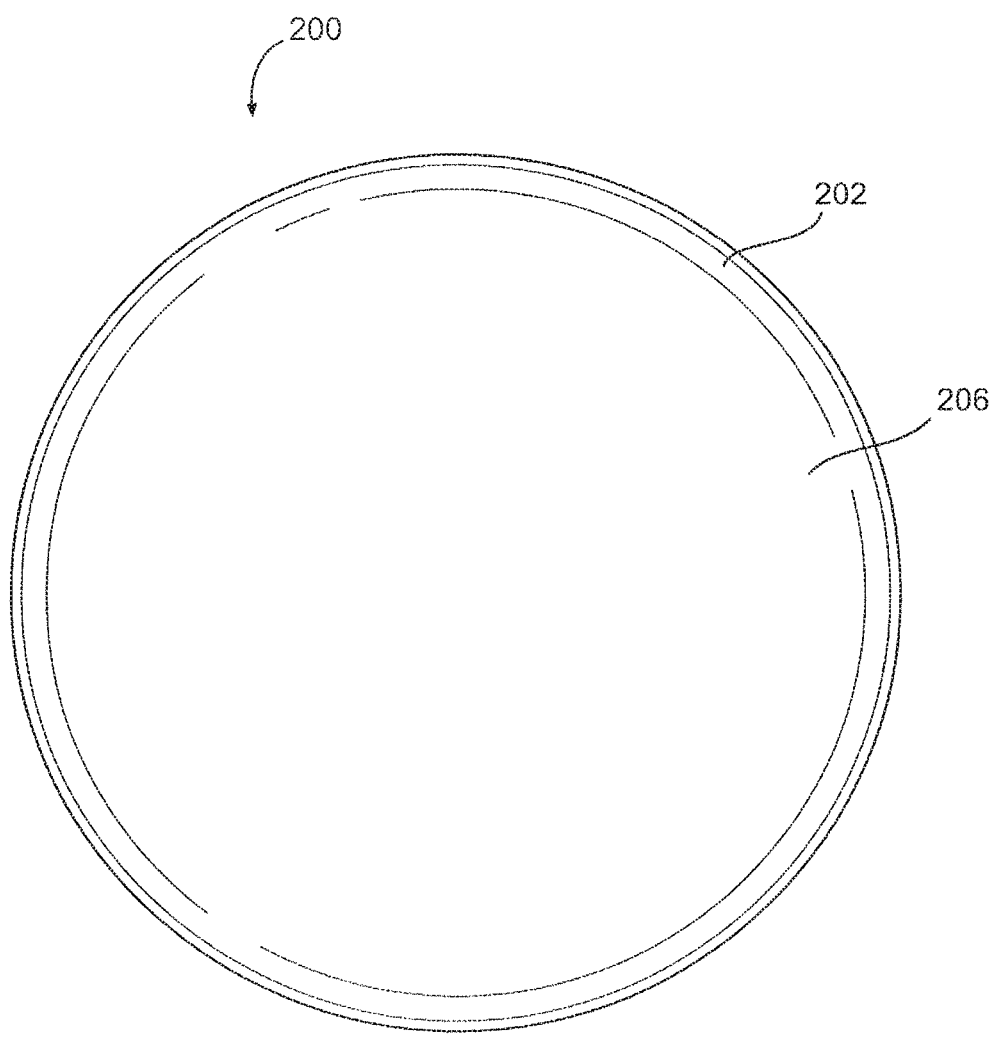
FIG. 4 is a front plan view of the magnetic accessory attachment device of FIG. 3.
Figure 5:
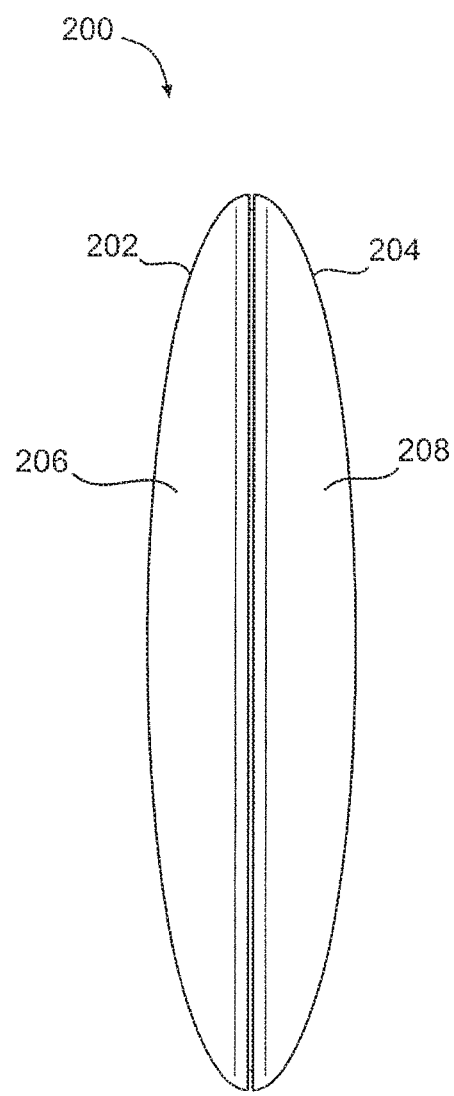
FIG. 5 is a side view of the magnetic accessory attachment device of FIG. 3.

Referring to FIGS. 1 and 2, a sink 100 for use with a magnetic sink accessory system including a ferromagnetic sink accessory belt is shown. The sink 100 can include one or more sink basins 102 and a rim 104. Each sink basin 102 can include one or more sidewalls 106 and a base 108. The base 108 can include an opening 110 for a drain. The sidewalls 106 and base 108 can form an interior surface 114 of the basin 102 to retain water and washable items. The sidewalls 106 and base 108 can also form an exterior surface 116 of the basin 102. The rim 104 can be used to support the basin 102 in an above-mount arrangement or under-mount arrangement with respect to a counter. Materials can be coated on the exterior surfaces of the basins, and such materials can include foams for insulation and/or materials having a smooth or rough texture. Although the sink 100 illustrated in FIGS. 1 and 2 includes two rectangular sink basins 102, other sink configurations including other numbers of sink basins having other shapes are also contemplated herein.

Figure 23:
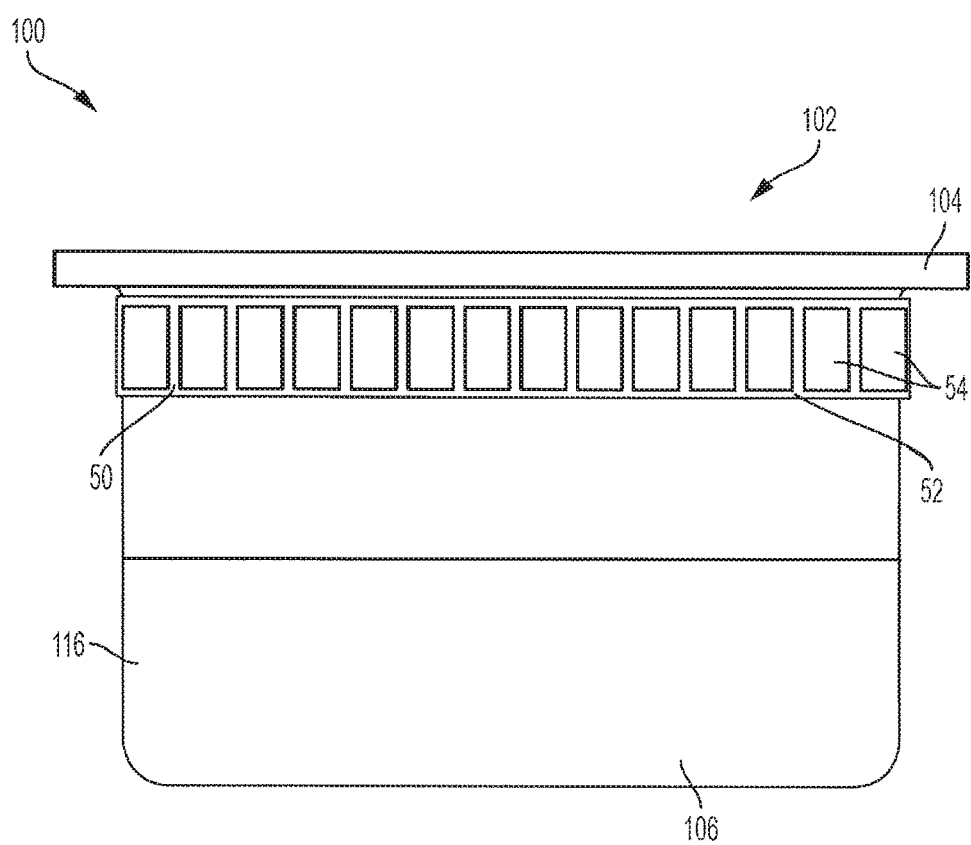
FIG. 23 is a side elevational view of the sink of FIG. 1.

In certain embodiments, the sink 100 can be constructed of a non-ferromagnetic material such that a magnet cannot be attached directly to a surface of the sink 100. In such embodiments, such as non-ferromagnetic stainless steel sinks or porcelain sinks, a non-magnetized ferromagnetic sink accessory belt can be attached to the sink 100 to attract a magnet to the sidewalls 106 of the sink. As shown in FIGS. 1, 2, and 23, one or more non-magnetized ferromagnetic sink accessory belts 50 can be adhered or otherwise secured to the exterior surface 116 of the sink basin 102. The accessory belt 50 can be secured to the exterior surface 116 near one or more of the sidewalls 106 and bases 108 of the sink basin 102. As will be appreciated from the following description, the accessory belt 50 can be secured to the exterior surface 116 of the sink using adhesives, elastic or spring mechanisms, or in any other suitable manner. In addition, any suitable number of accessory belts 50 may be disposed in any suitable position on the sink basin 102 or rim 104. In some embodiments, the accessory belts 50 can cover all or substantially all of the exterior surface 116 of the sink basin 102 and/or underside of the rim 104. By utilizing a non-magnetized ferromagnetic material instead of a magnet as part of the accessory belt 50, inadvertent attachment of ferromagnetic objects to the sink is avoided. During service, a magnetic attractive force between a magnet in an accessory placed within the sink basin, and the non-magnetized ferromagnetic sink accessory belt, which magnetic force extends through the wall of the sink basin and other material layers or coatings applied to the sink wall can be used to retain the accessory in place within the sink basin. For example, materials that may be coated on the sink side or bottom wall portions can include foams for insulation and/or other materials having a smooth or rough texture.

FIGS. 23-27 illustrate an embodiment of the accessory belt 50. The accessory belt 50 includes an elongate flexible band 52 and a plurality of ferritic metal pieces 54. The flexible band 52 can be made from any suitable flexible material, such as flexible plastic or textile material. In some embodiments the flexible band 52 covers the entirety of the ferritic metal pieces, and in some embodiments the flexible band forms a connection between adjacent metal pieces and does not cover the entirety of each metal piece. In the illustrated embodiment, the ferritic metal pieces 54 are rectangular and made from ferritic steel that has been galvanized and tumbled to remove burs and sharp edges. However, it is contemplated that the ferritic metal pieces 54 can be any suitable material of any suitable shape and size depending on the sink metal thickness, the size of the corresponding magnets, and the amount of weight the accessory belt 50 must hold for a given application. The plurality of ferritic metal pieces 54 are adhered or otherwise secured to at least one side of the flexible band 52. The segmentation of the ferritic material in pieces separated by spaces allows the belt 50 to bend and conform to the curved external sink surface. In some embodiments, the adhesive used to secure the ferritic metal pieces 54 to the flexible band 52 can stand up to extreme temperatures and high levels of moisture.

Although FIG. 24 shows a single row of ferritic metal pieces 54 adhered to the flexible band 52, it is contemplated that multiple rows of metal pieces could be used, or the metal pieces could be arranged in other configurations suitable to fit the contours of the surface to which the accessory belt 50 is to be secured. The distance 56 between the ferritic metal pieces 54 when secured to the flexible band 52 can vary for each application, as can the dimensions of the metal pieces. In one aspect, when a portion of the accessory belt 50 is applied against a curved contour of the sink, the distance between the ferritic metal pieces 54 can be determined based on the thickness of the metal pieces, the radii of the sink onto which the belt will be secured, and other design considerations so that the metal pieces lie generally flat against the sink when that segment of the belt is applied against a curved sink contour. For example, using a relatively larger distance between each metal piece 54 and/or using a narrow dimension for each metal piece and a small spacing between pieces may be appropriate when the accessory belt 50 is applied to a sink curve with a relatively small radius, while a relatively smaller distance between adjacent metal pieces and/or a wider dimension for each metal piece may be appropriate for a sink curve with a relatively large radius.

Figure 26:
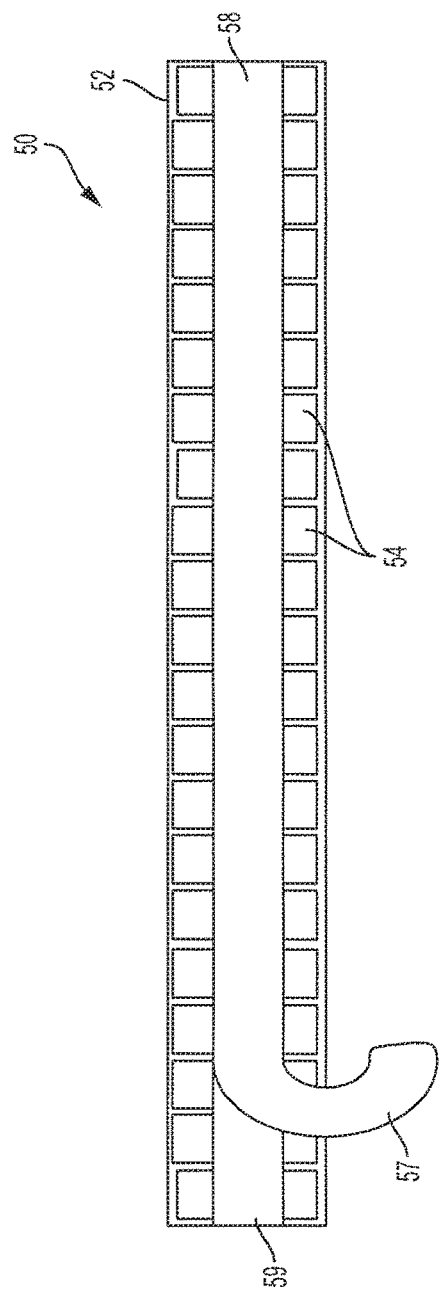
FIG. 26 is another front view of another embodiment of the ferromagnetic accessory belt of FIG. 24.

FIG. 25 shows an embodiment of the accessory belt 50 that includes an adhesive strip such as double-faced mounting tape 58 applied across the metal pieces 54. In such an embodiment, a first adhesive side of the mounting tape 58 is applied to the metal pieces 54 that have been secured to the flexible band 52. In some embodiments, however, it is contemplated that the mounting tape 58 can be applied to the flexible band 52 itself instead of the metal pieces 54. It is also contemplated that, in some embodiments, the flexible band 52 is itself the flexible band that connects the metal pieces to one another. As shown in FIG. 26, a second adhesive side 59 of the mounting tape 58 is exposed by peeling back a face tape protector 57. In embodiments that use mounting tape 58, the second adhesive side 59 of the mounting tape 28 is used to adhere the accessory belt 50 to the exterior surface 116 of a sink's sidewall 106. The adhesive properties of the tape 58 can aid in securing the belt onto the outer sink walls even if such walls are covered or coated with other materials having rough textures requiring a larger contact area for the adhesive to form a bond between the belt 50 and the sink 100 of sufficient strength.

Figure 27:
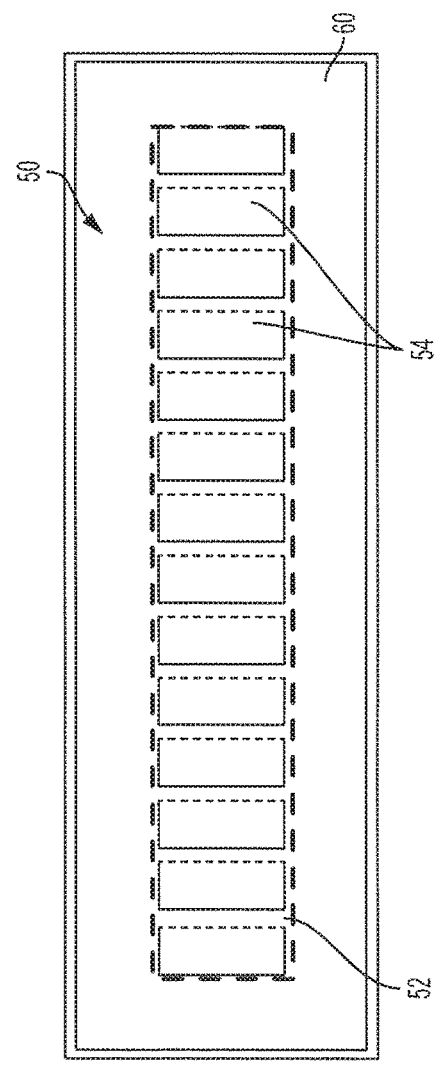
FIG. 27 is a front view of the ferromagnetic accessory belt of FIG. 24 with covering tape mounted thereon.
Figure 28:
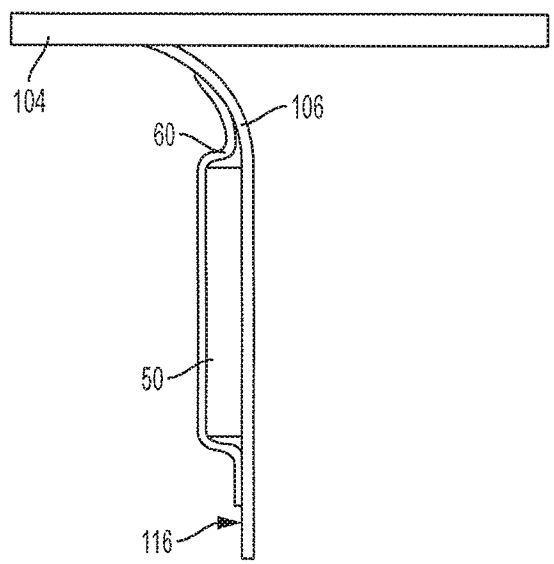
FIG. 28 is a fragmentary section view of the ferromagnetic accessory belt of FIG. 24 installed on a sink.

In certain embodiments, such as those illustrated in FIGS. 27 and 28, covering tape 60 is used to secure the accessory belt 50 to the exterior surface 116. Covering tape 60 can be used in addition to the double-faced mounting tape 58 discussed above, or can secure the accessory belt 50 against the exterior surface 116 without use of the mounting tape. FIG. 27 shows the covering tape 60 positioned with respect to the accessory belt 50 as viewed from the front, overlapping each side of the accessory belt. FIG. 28 shows a sectional side view of the covering tape 60 mounted over the accessory belt 50 as applied to the exterior surface 116 of the sink sidewall 106 just below the rim 104 of the sink 100. In certain embodiments, the covering tape 60 is made of a sealing material that can help seal out moisture, such as a metal foil tape or other suitable material.

FIGS. 29-37 illustrate another embodiment the accessory belt 50 that includes a tension spring assembly 62 to secure the accessory belt to the sidewalls 106 of the sink 100. As shown in FIGS. 29 and 30, the tension spring assembly 62 includes a spring 64 or other elastic or resilient element, at least one ring 66, and at least one tensioning strap 68. The rings 66 are connected to one end of each tensioning strap 68, and the spring 64 elastically connects the rings 66 to one another, creating an elastic connection between the two tensioning straps 68. FIG. 31 illustrates an embodiment of a tensioning strap 68 connected to a ring 66.

The embodiment of the accessory belt 50 illustrated in FIG. 32 has metal pieces 54 secured in a row to at least a portion of a sink side 51 of the flexible band 52. As shown in FIG. 33, the tension spring assembly 62 is connected to a loop side 53 of the flexible band 52, which is opposite the sink side 51. In the illustrated embodiment, one of the tensioning straps 68 is secured to the loop side 53 of the flexible band 52. The tensioning strap 68 can be secured to the flexible band 52 using any suitable method, such as adhesives or hook and loop fasteners. It is also contemplated that, in some embodiments, the tensioning straps 68 are permanently secured to the flexible band 52 or that the rings 66 and spring 64 are secured directly to the flexible band 52.

Figure 35:
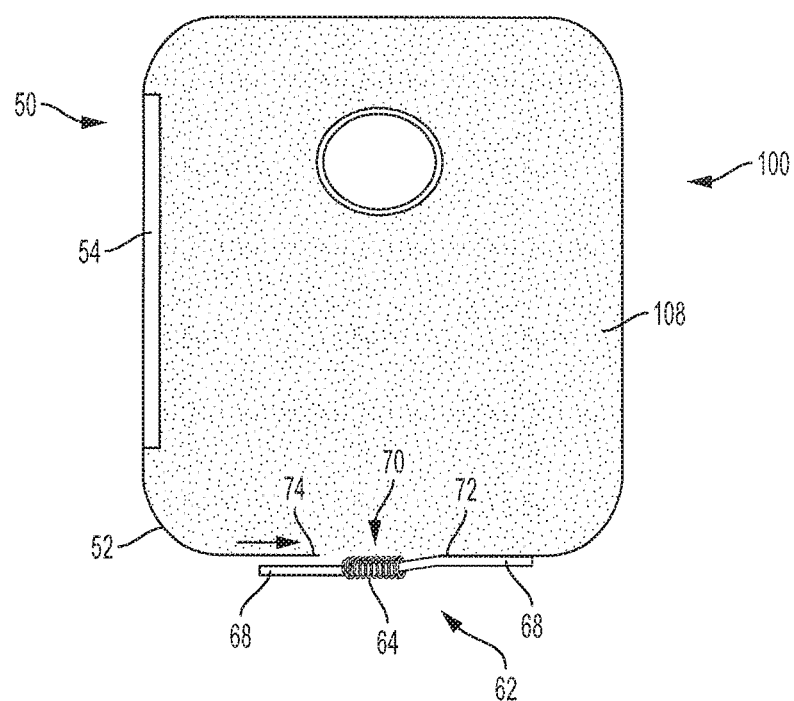
FIG. 35 is a bottom view of the ferromagnetic accessory belt of FIG. 32 partially installed on a sink with the tension spring assembly of FIG. 29.
Figure 36:
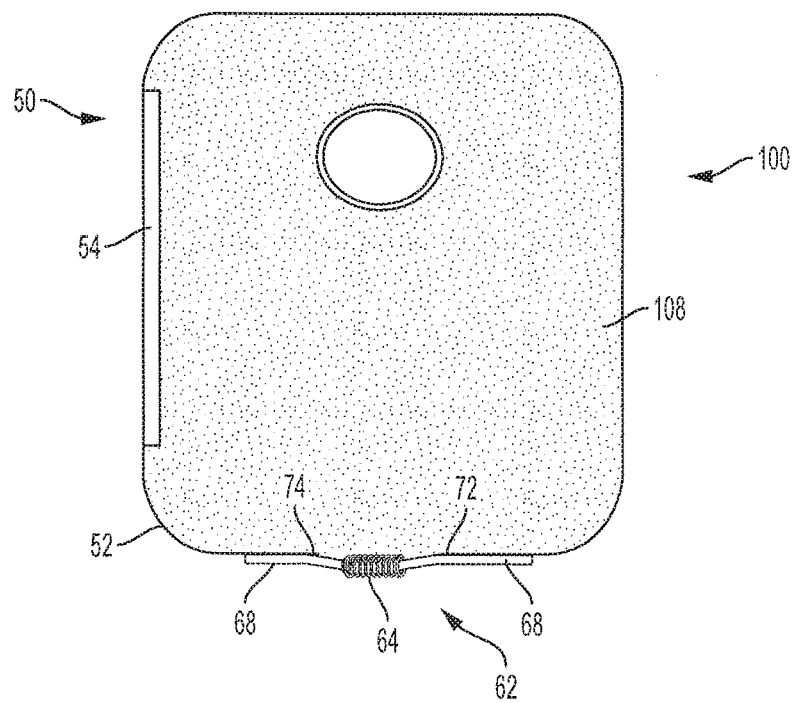
FIG. 36 is a bottom view of the ferromagnetic accessory belt of FIG. 32 installed on a sink with the tension spring assembly of FIG. 29.

FIGS. 34-36 illustrate a method of installing the accessory belt 50 onto the exterior surface 116 of the sink 100 using an embodiment of the tension spring assembly 62. FIG. 34 illustrates the accessory belt 50 disposed around the exterior surface 116 of the sink 100 as viewed from the bottom of the sink. In the illustrated embodiment, the metal pieces 54 of the accessory belt 50 cover only a portion of the flexible band 52, but it is contemplated that the metal pieces can cover substantially the entirety of the flexible band to substantially surround the entire sink. When the accessory belt 50 in FIG. 34 is in position around the sink, a gap 70 exists between a first end 72 and a second end 74 of the flexible band 52. As shown in FIG. 35, one of the tensioning straps 68 from the tension spring assembly 68 is connected to the first end 72 of the flexible band 52. Once the flexible band 52 has been positioned as desired around the exterior surface 116 and with the desired tension, the remaining tensioning strap 68 from the tension spring assembly 68 is connected to the second end 74 of the flexible band 52, as shown in FIG. 36. The tension spring assembly 68 can be removed and re-secured to the flexible band 52 as necessary to properly position the accessory belt 50 around the sink 100. FIG. 37 illustrates the accessory belt 50 installed against the exterior surface 116 of the sidewalls 106 of the sink 100 just below the rim 104.

Although the illustrated embodiments show a tension spring assembly that is detachable from the flexible band 52 of the accessory belt 50, it is contemplated that, in some embodiments, the flexible band 52 can be integral with the tensioning straps of the tension spring assembly. In such embodiments, the spring 64 can be detachable from the rings 66 in order to mount the accessory belt 50 to the sink 100, or the accessory belt can be installed by sliding the flexible band 52 up from the bottom of the sink to the desired position through use of the spring. It is also contemplated that, in some embodiments, both the tension spring assembly and an adhesive can be used together to secure the accessory belt to the sink.

Figure 6:
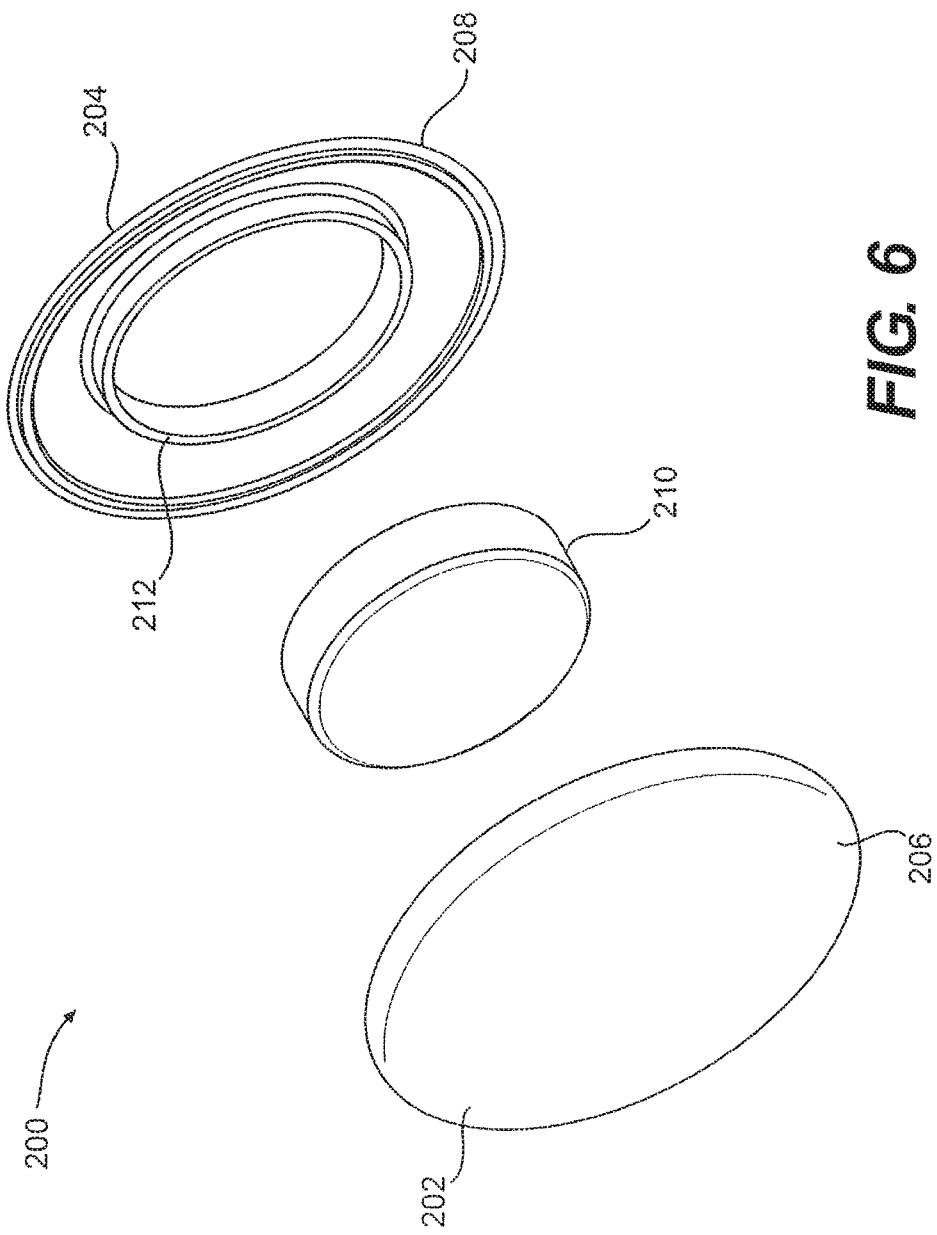
FIG. 6 is an exploded perspective view of the magnetic accessory attachment device of FIG. 3.

Turning to FIGS. 3-6, a magnetic accessory attachment device 200 is shown. The device 200 can be any suitable shape and size. For example, in the embodiment shown in the figures, the device 200 can be generally disc-shaped body with contoured major first and second external surfaces 202, 204. It will be appreciated that the major surfaces 202, 204 can be any suitable shape, such as convex. The device 200 can be formed of one or more pieces. For example, as shown in FIG. 6, the device 200 can have two pieces 206, 208 that can be connected together in any suitable manner to form an encasement. A magnet 210 of any suitable shape, size, and magnetic strength may be disposed within the device 200. To restrict movement of the magnet 210 within the device 200, one or more of the interior facing surfaces of the device 200 can include an annular wall 212 extending therefrom. The magnet 210 can fit within the wall 212 such that the wall 212 at least partially surrounds the magnet 210 when the pieces 206, 208 of the device 200 are assembled. The pieces 206, 208 can be made of any suitable material.

The magnet 210 disposed within the device 200 permits the device 200 to magnetically attach to the sink 100 if the sink is ferromagnetic or to the accessory belt 50 behind the sink 100 if the sink 100 is not ferromagnetic. In the latter configuration, the device 200 has the appearance from a user's perspective of being attracted to the sink, but instead, the device 200 is retained against the interior surface 114 of the basin 102 due to the attractive force, which passes through the basin 102, between the device 200 and the accessory belt 50.

The contoured shapes of the major surfaces 202, 204 permit the device 200 to contact the sink 100 at only a portion of one of the major surfaces 202, 204. Due to the high strength of magnet used, the contoured shape reduces the possibility of pinching a user's fingers with the device 200. In addition, the contoured shape of the device 200 causes the major surface of the device in contact with the sink 100 to move away from the point of contact with the sink 100 and provide a finger-hold on the device 200 in the space between the device 200 and the sink 100 to assist with removal of the device 200.

The device 200 can be shaped to provide a universal attachment feature useable with any number of suitable accessories. An accessory may be made of a non-magnetized ferromagnetic material or have a non-magnetized ferromagnetic portion suitably shaped to mate with the device 200. More specifically, either or both major surfaces 202, 204 can be shaped to mate with the accessory, and the accessory can have an attachment portion, described further below, shaped to mate with the device 200. Accordingly, the shape of the attachment portion can operate as a locator for receiving the device 200 in a desired position and/or orientation on the accessory. The accessory can be indirectly attached to a sink with the device 200.

The ability to separate the device 200 from the accessories permits both the device and the accessories to be easily cleaned. In addition, the use of the device 200 as an intermediary attachment mechanism permits the accessories to be manufactured more efficiently, at a faster rate, at a lower cost, and at a lighter weight because a magnet is not incorporated into each of the accessories. In addition, because the accessories can be made to include a non-magnetized ferromagnetic material, the accessories can be stored without inadvertent attachment to other non-magnetized ferromagnetic objects, such as in a drawer or cabinet.

Examples of suitable accessories are shown in FIGS. 7-22 and further described below. However, it will be appreciated that any suitable accessory can be coupled to the device 200 for magnetic attachment via the device 200 to a sink 100.

Figure 7:
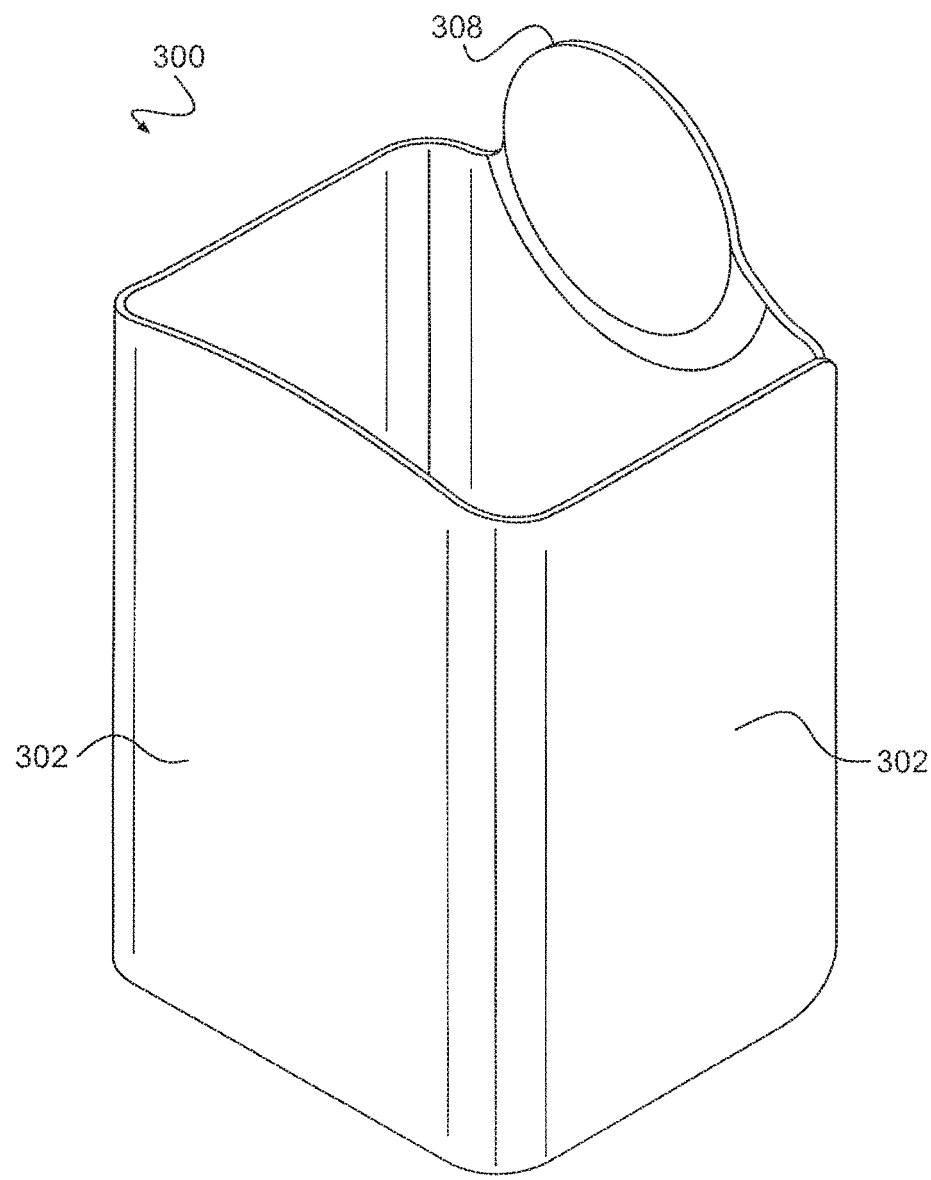
FIG. 7 is a perspective view of an accessory for use with the magnetic accessory attachment device of FIG. 3 embodied as a cup.
Figure 8:
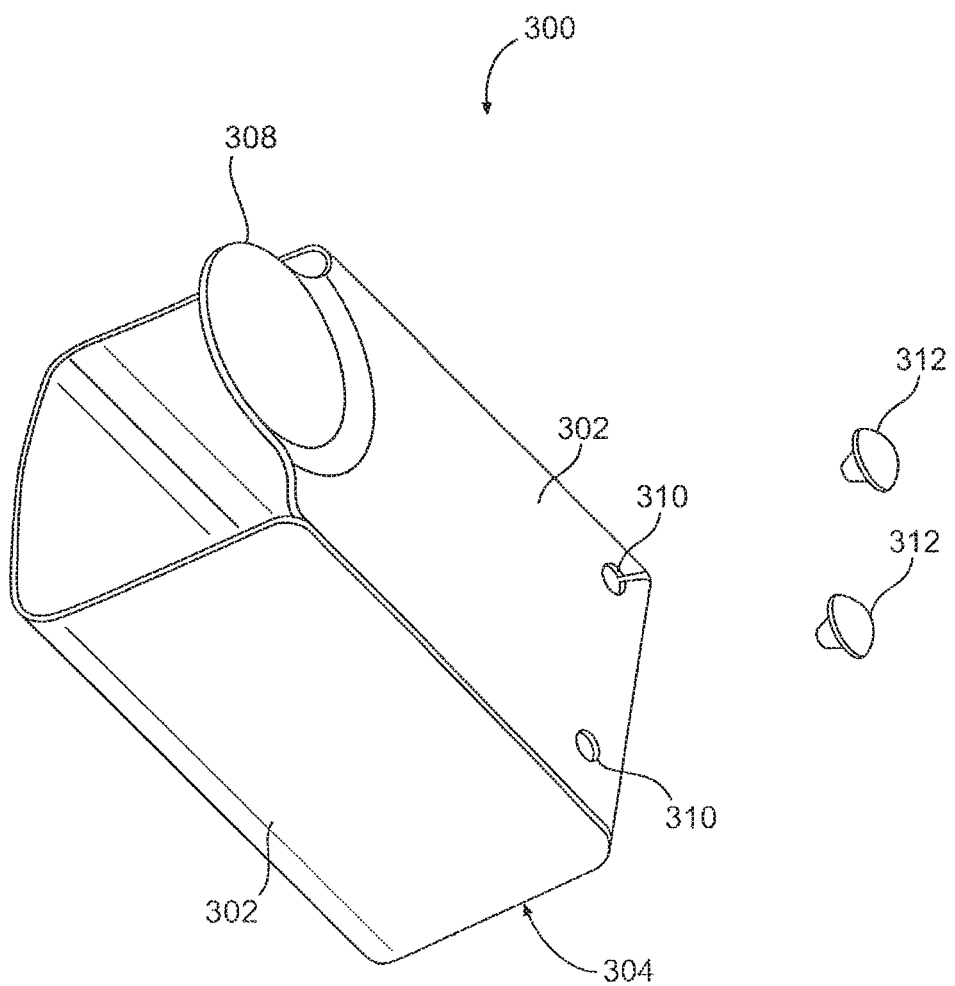
FIG. 8 is an exploded perspective view of the accessory of FIG. 7.
Figure 9:
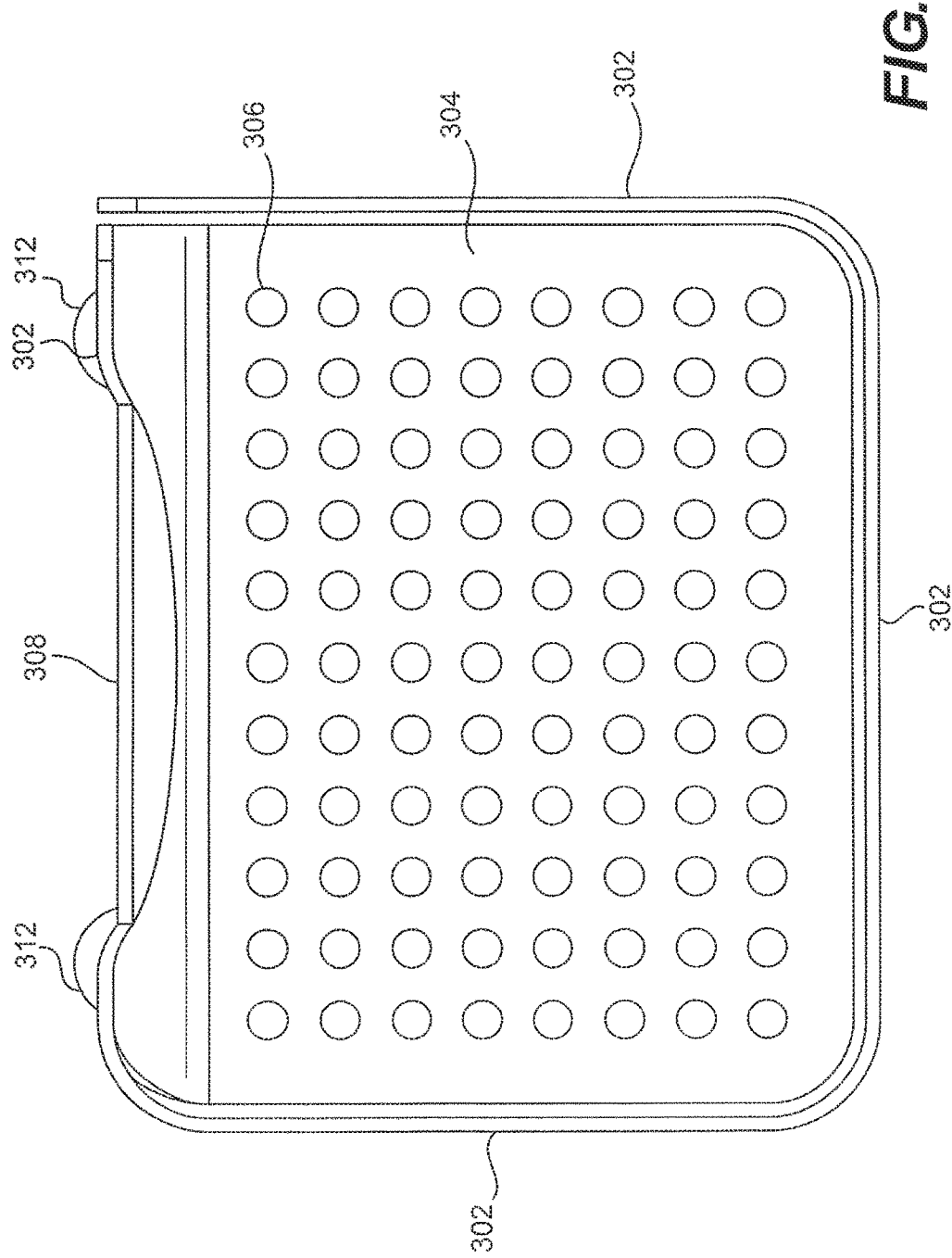
FIG. 9 is a top plan view of the accessory of FIG. 7.
Figure 10:
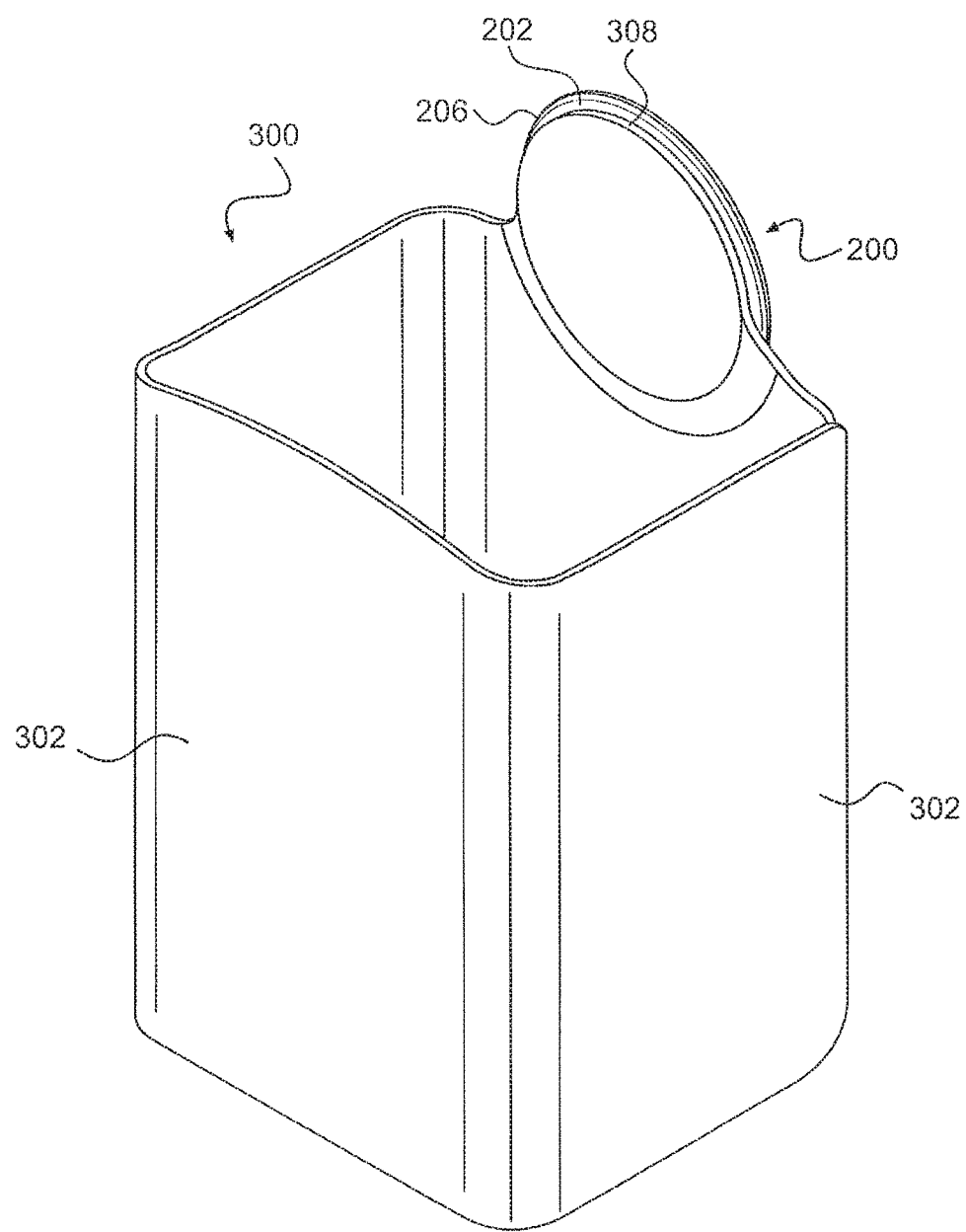
FIG. 10 is a perspective view of the accessory of FIG. 7 attached to the magnetic accessory attachment device of FIG. 3.
Figure 11:
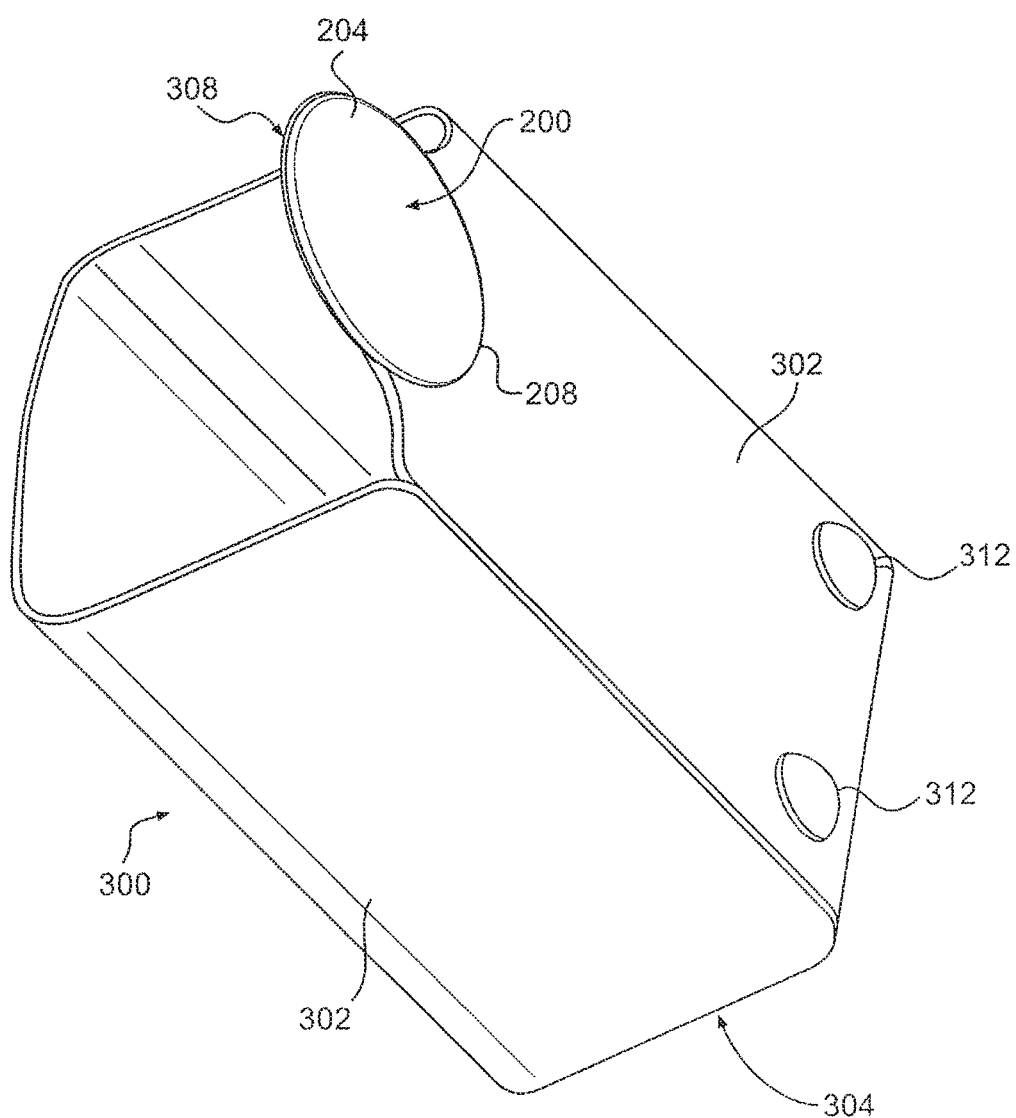
FIG. 11 is another perspective view of the accessory of FIG. 7 attached to the magnetic accessory attachment device of FIG. 3.

FIGS. 7-9 show an accessory in the form of a cup 300. The cup 300 includes sidewalls 302 and a base 304. The base 304 can include a plurality of apertures 306 to permit water to drain through the cup 300. The cup 300 may be used to hold objects such as silverware or cleaning brushes. The cup 300 can include an attachment portion 308 constructed with a non-magnetized ferromagnetic material. The attachment portion 308 can be shaped to receive the device 200. In this embodiment, as shown in FIGS. 10 and 11, the attachment portion 308 can be concave to receive a convex major surface 202 of the device 200. The magnet 210 within the device 200 magnetically attaches the device 200 to the ferromagnetic material of the attachment portion 308.

Figure 12:
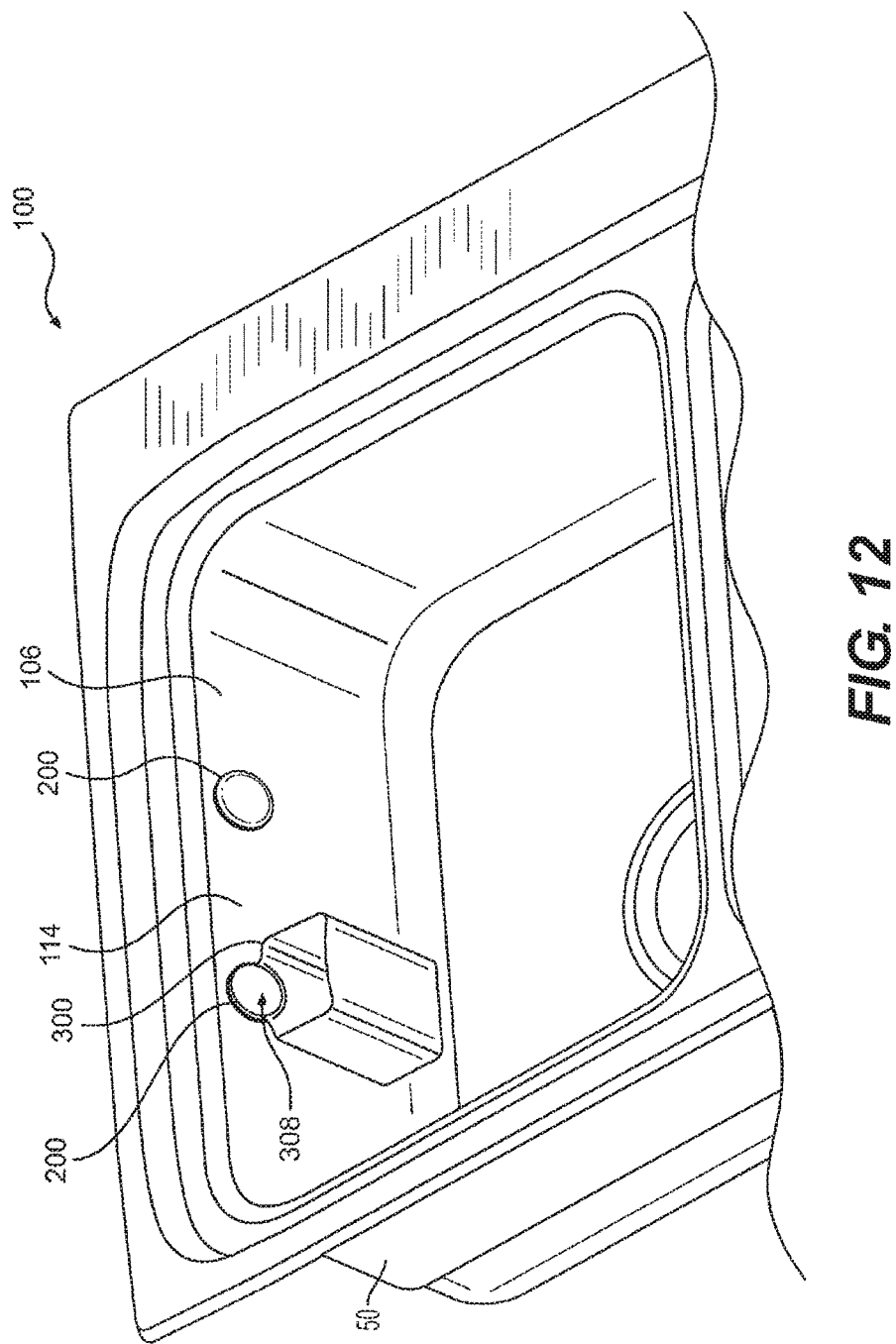
FIG. 12 is a fragmentary perspective view of the magnetic accessory attachment device of FIG. 3 and the accessory of FIG. 7 attached to the sink of FIG. 1.
Figure 13:
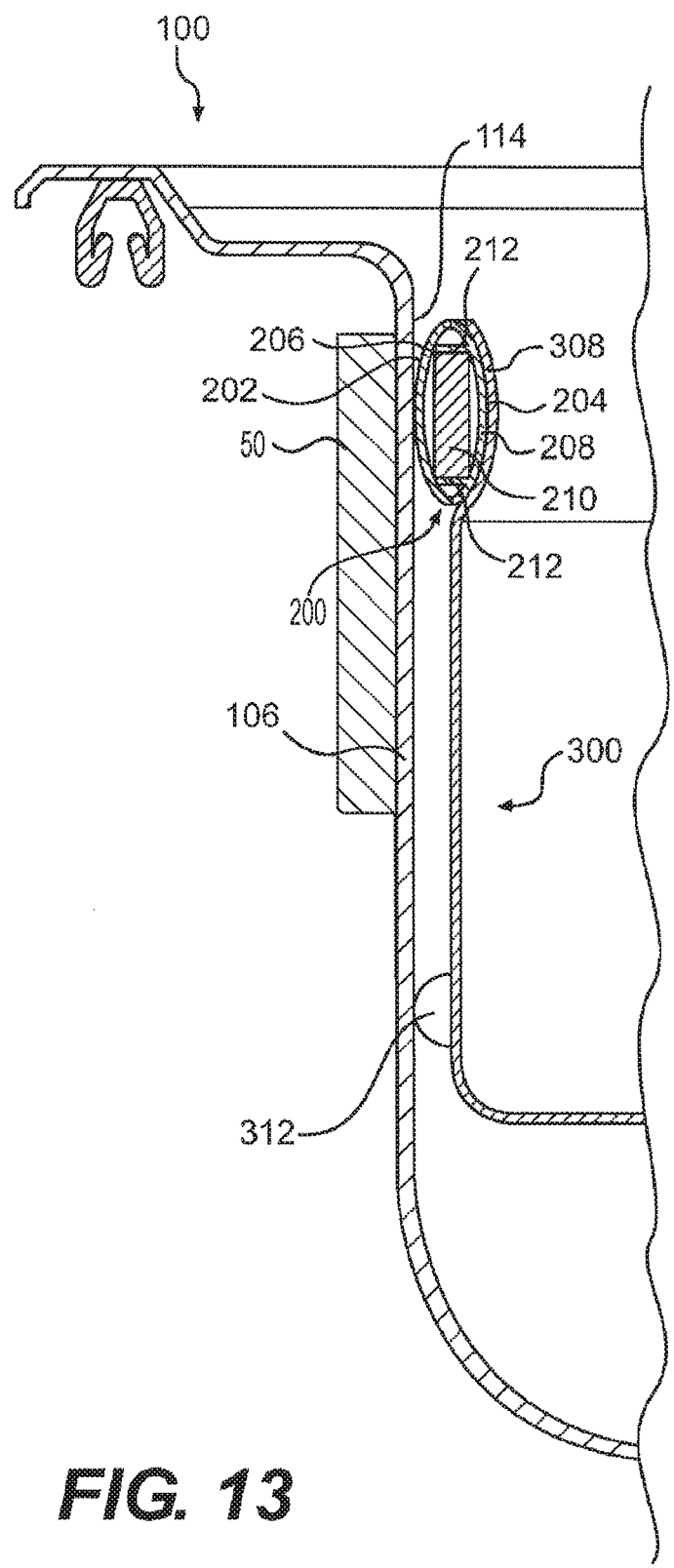
FIG. 13 is a fragmentary section view of the magnetic accessory attachment device of FIG. 3 and the accessory of FIG. 7 attached to the sink of FIG. 1.

As shown in FIGS. 12 and 13, once the device 200 is attached to the accessory, the device 200 can be magnetically attached to the interior surface 114 of the sink basin 102, by virtue of the attraction between the device 200 and the accessory belt 50, to retain the accessory to the sink basin 102. Of course, it will also be appreciated that the device 200 can be attached to the sink 100 by itself as shown in FIG. 12 prior to attachment of an accessory or for storage when not in use with an accessory.

Referring again to FIGS. 8 and 11, the cup 300 can include one or more openings 310 to receive pins 312. The pins 312 can space the edge of the cup 300 from the sidewall 106 of the sink 100 to make the cup 300 generally parallel to the sidewall 106 and to avoid direct contact between the cup 300 and the sink 100, which might scratch the sink 100. The pins 312 can be rubber or another suitably soft material to avoid scratching the sink 100. The pins 312 can also provide a frictional force against the sidewall 106 to increase the weight capacity of the of the cup 300.

Figure 14:
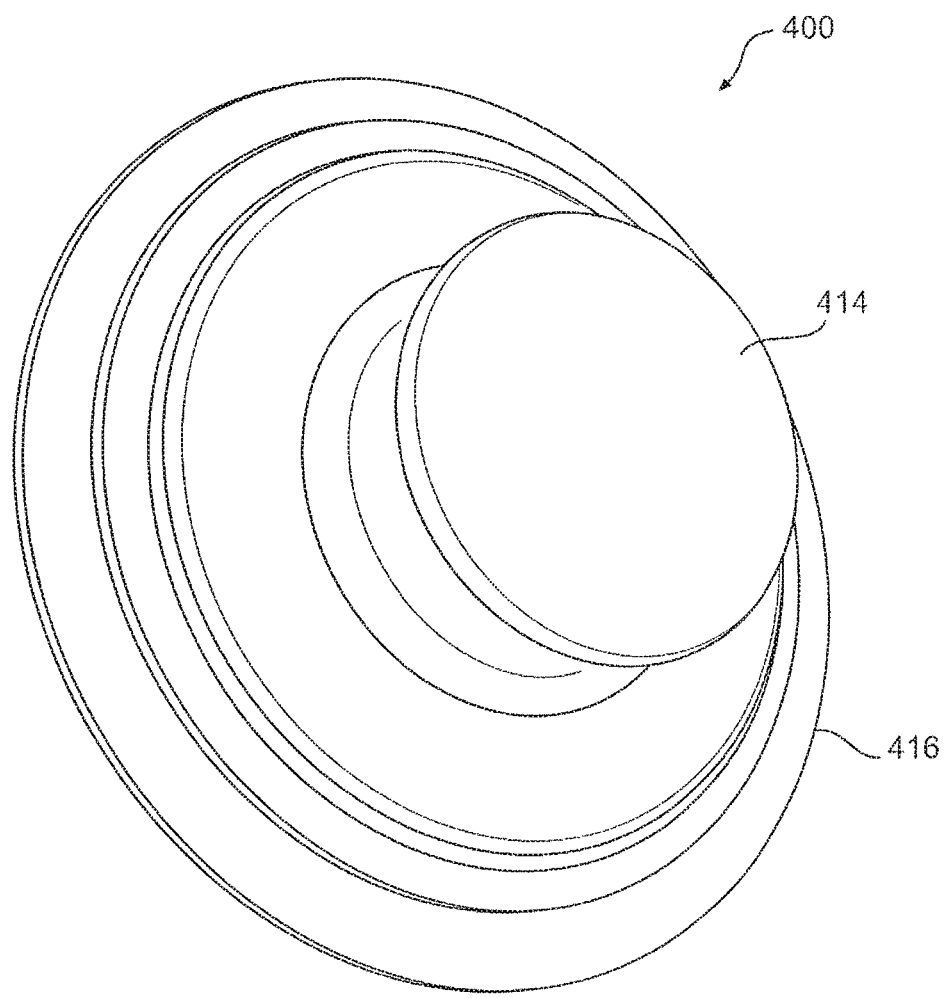
FIG. 14 is a perspective view of an accessory for use with the magnetic accessory attachment device of FIG. 3 embodied as a drain stopper.
Figure 15:
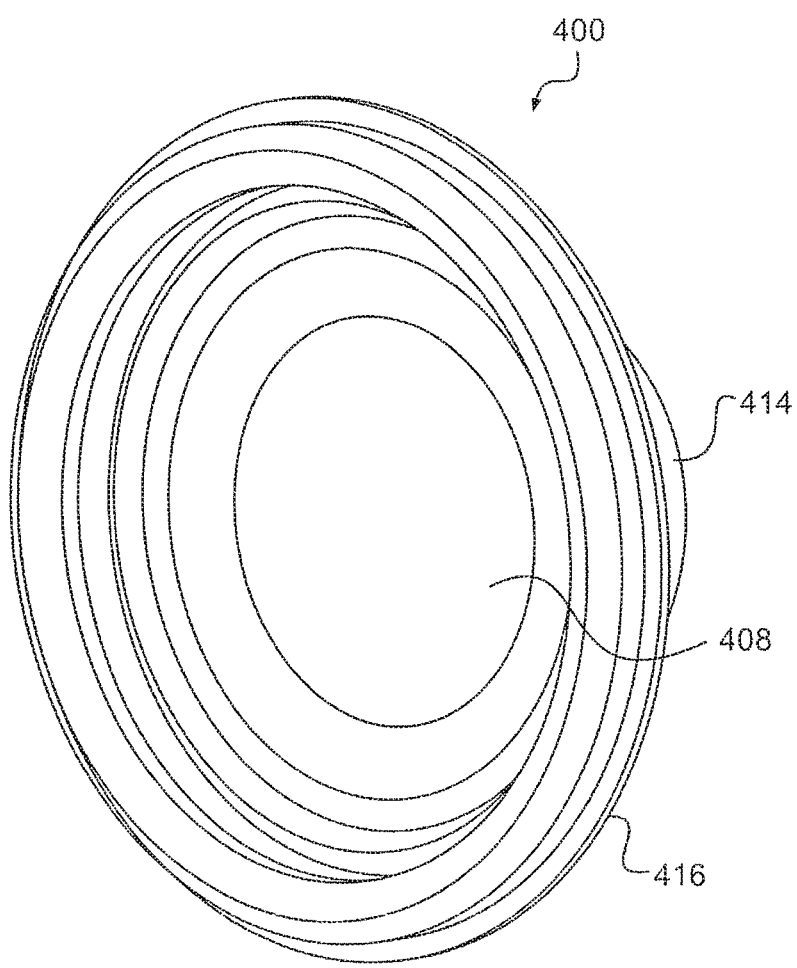
FIG. 15 is another perspective view of the accessory of FIG. 14.
Figure 16:
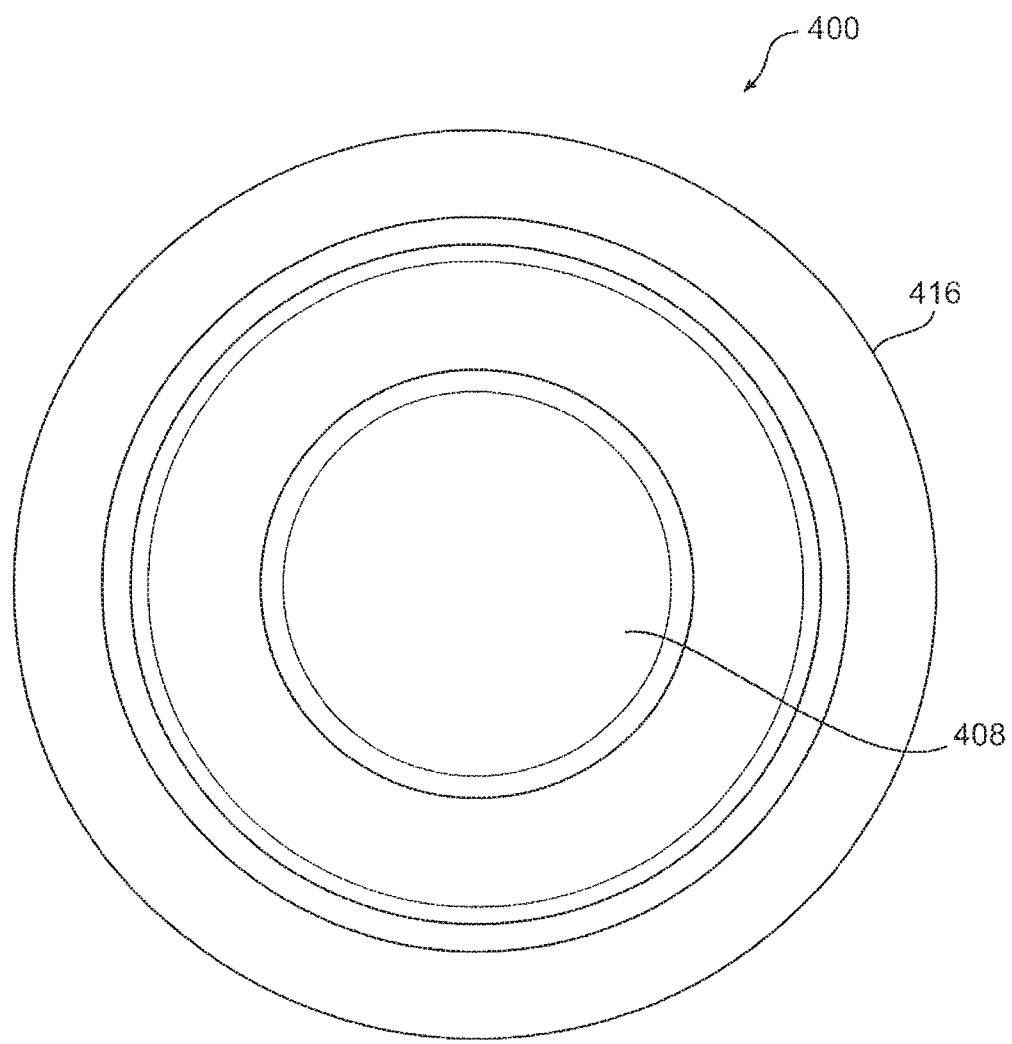
FIG. 16 is a bottom plan view of the accessory of FIG. 14.

FIGS. 14-16 show an accessory in the form of a drain stopper 400. The stopper 400 can be used to cover the drain and prevent water from draining out of the sink 100. The stopper 400 can include a knob 414 for gripping the stopper 400 and a seal 416 around a perimeter of the stopper 400. The seal 416 can prevent the flow of water past the stopper 400 such that a body of water can be retained in the sink basin 106 without draining. FIGS. 15 and 16 show an underside of the stopper 400, which can include an attachment portion 408 constructed with a non-magnetized ferromagnetic material. The attachment portion 408 can be shaped to receive the device 200. In this embodiment, the attachment portion 408 can be concave to receive a convex major surface of the device 200. The magnet 210 within the device 200 magnetically attaches the device 200 to the ferromagnetic material of the attachment portion 408. Once the device 200 is attached to the accessory, the device 200 can be magnetically attached to the interior surface 114 of the sink basin 102, by virtue of the attraction between the device 200 and the accessory belt 50, to retain the accessory to the sink basin 102. The knob 414 can be oriented toward the sink, or alternatively, the seal 416 can be oriented toward the sink to avoid scratching the sink. In either arrangement, the device 200 is in contact with the drain stopper 400, but not in contact with the sink.

Figure 17:
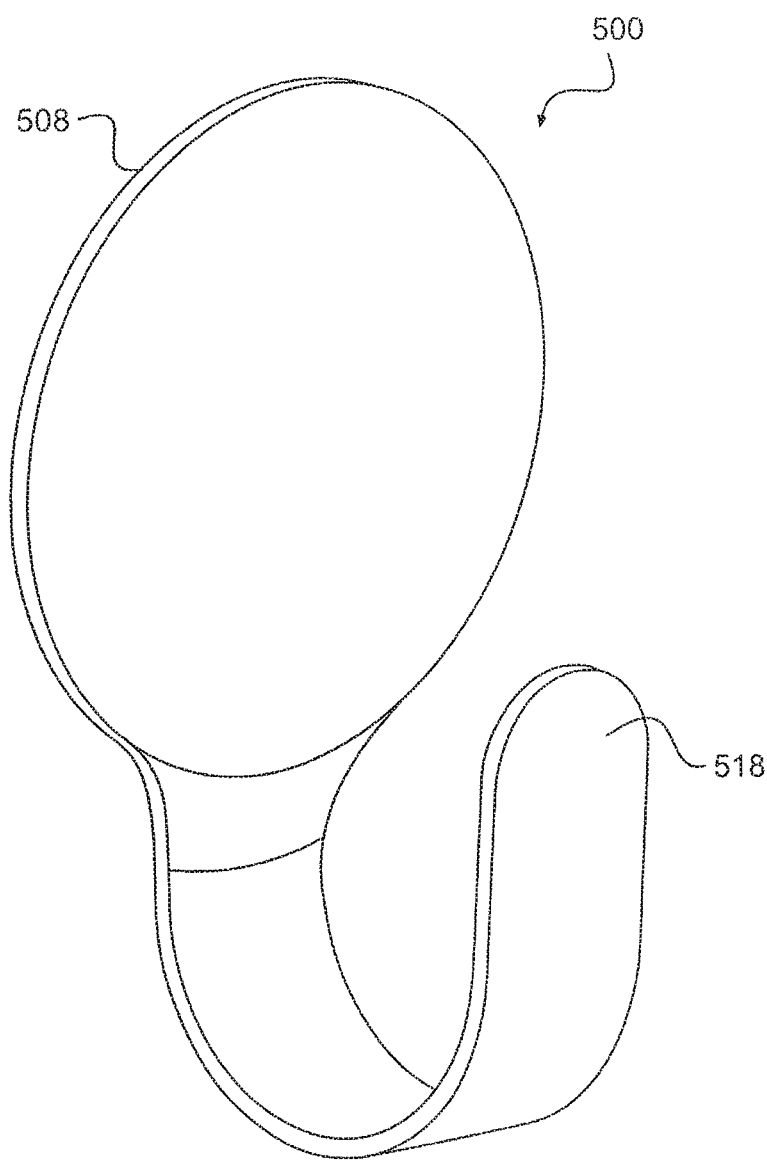
FIG. 17 is a perspective view of an accessory for use with the magnetic accessory attachment device of FIG. 3 embodied as a hook.
Figure 18:
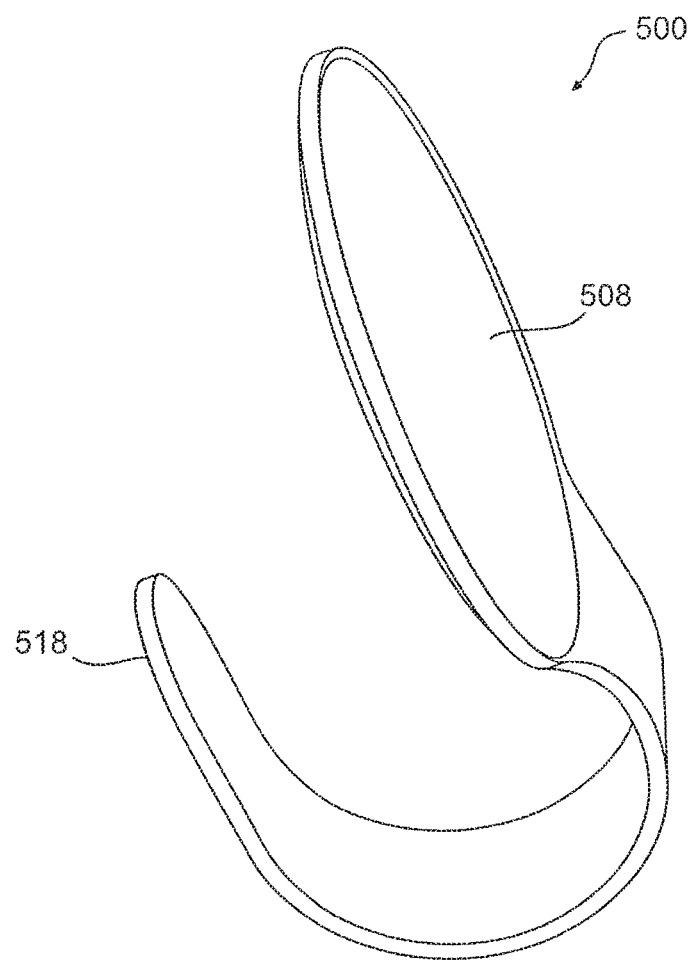
FIG. 18 is another perspective view of the accessory of FIG. 17.

FIGS. 17 and 18 show an accessory in the form of a hook 500. The hook 500 can include a finger 518 for hanging an object. The hook 500 can include an attachment portion 508 constructed with a non-magnetized ferromagnetic material. The attachment portion 508 can be shaped to receive the device 200. In this embodiment, the attachment portion 508 can be concave to receive a convex major surface of the device 200. The magnet 210 within the device 200 magnetically attaches the device 200 to the ferromagnetic material of the attachment portion 508. When the device 200 is attached to the accessory, the device 200 can be magnetically attached to the interior surface 114 of the sink basin 102, by virtue of the magnetic attraction between the device 200 and the accessory belt 50, to retain the accessory to the sink basin 102.

Figure 19:
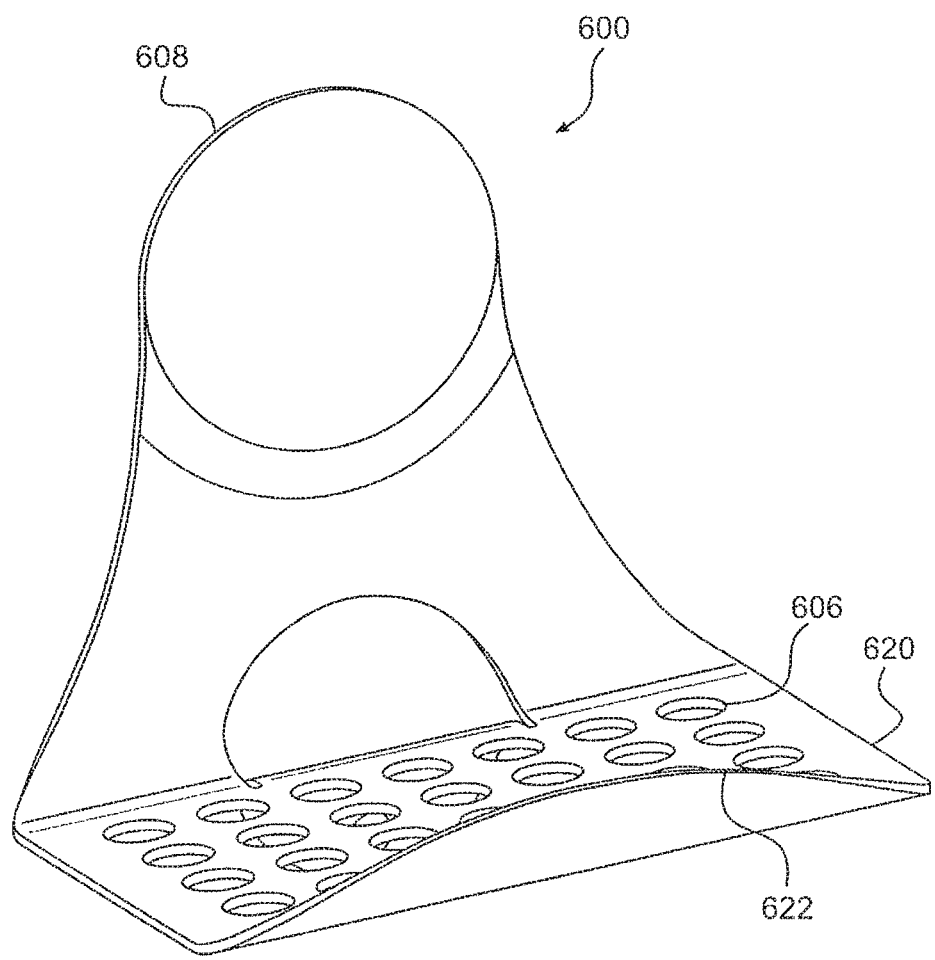
FIG. 19 is a perspective view of an accessory for use with the magnetic accessory attachment device of FIG. 3 embodied as a small shelf.
Figure 20:
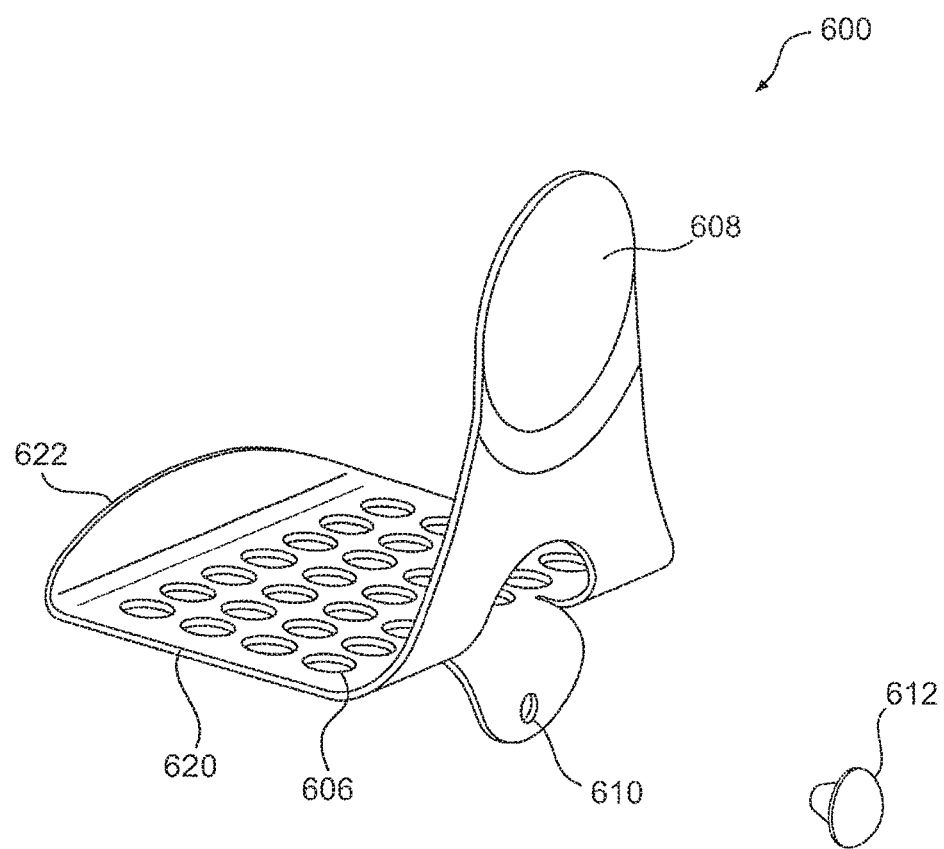
FIG. 20 is an exploded perspective view of the accessory of FIG. 19.

FIGS. 19 and 20 show an accessory in the form of a small shelf 600 for a bar of soap or other suitable object. The shelf 600 can include a platform 620 for supporting a bar of soap or other object. The platform 620 can include a plurality of apertures 606 to permit water to drain therethrough. The platform 620 can have a raised lip 622 to prevent an object from sliding off the platform at the lip 622. The shelf 600 can include an attachment portion 608 constructed with a non-magnetized ferromagnetic material. The attachment portion 608 can be shaped to receive the device 200. In this embodiment, the attachment portion 608 can be concave to receive a convex major surface of the device 200. The magnet 210 within the device 200 magnetically attaches the device to the ferromagnetic material of the attachment portion 608. When the device 200 is attached to the accessory, the device 200 can be magnetically attached to the interior surface 114 of the sink basin 102, by virtue of the magnetic attraction between the device 200 and the accessory belt 50, to retain the accessory to the sink basin 102. The shelf 600 can include one or more openings 610 to receive one or more pins 612. The pin 612 can space the edge of the shelf 600 from the sidewall 106 of the sink 100 to make the shelf 600 generally parallel to the sidewall 106 and to avoid direct contact between the shelf 600 and the sink 100, which might scratch the sink 100. The pin 612 can be rubber or another suitably soft material to avoid scratching the sink 100. The pin 612 can also provide a frictional force against the sidewall 106 to increase the weight capacity of the shelf 600.

Figure 21:
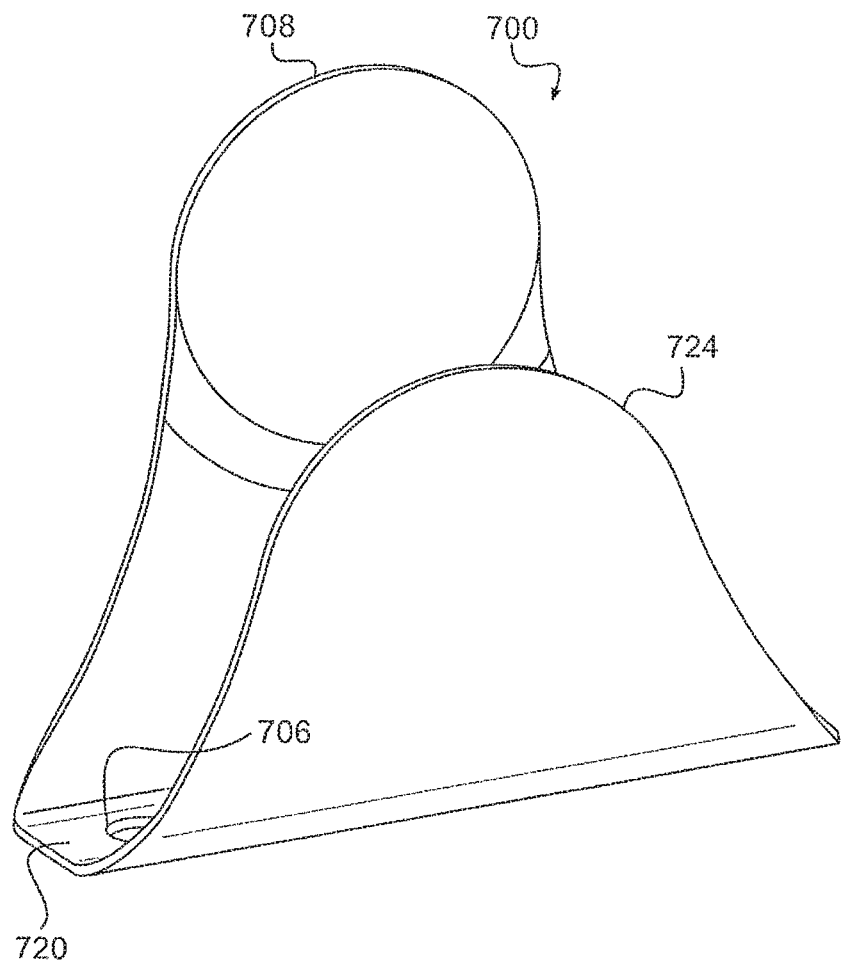
FIG. 21 is a perspective view of an accessory for use with the magnetic accessory attachment device of FIG. 3 embodied as a sponge holder.
Figure 22:
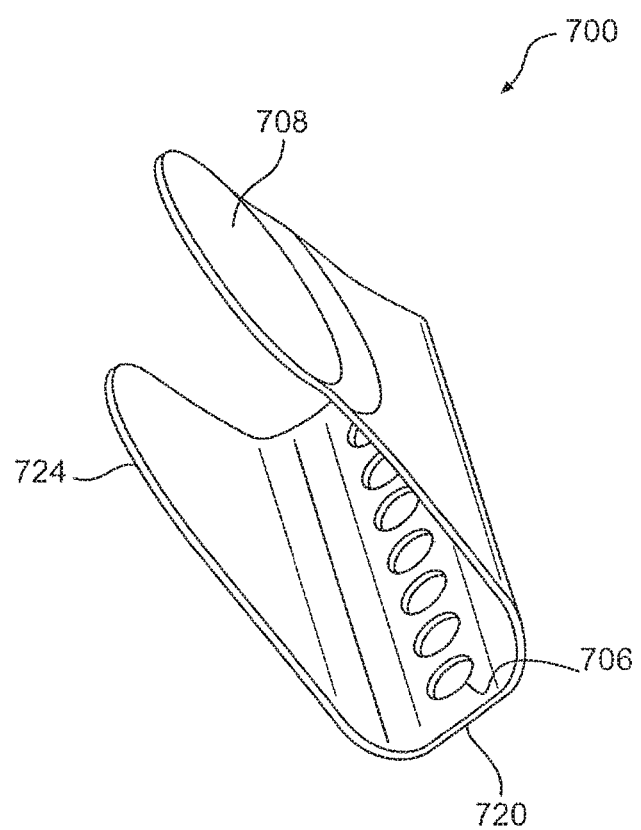
FIG. 22 is another perspective view of the accessory of FIG. 21.

FIGS. 21 and 22 show an accessory in the form of a holder 700 for a sponge or other suitable object. The holder 700 can include a platform 720 and an extended wall 724. The platform 720 can include a plurality of apertures 706 to permit water to drain therethrough. The wall 724 can project in a generally perpendicular direction from the platform 720. The holder 700 can include an attachment portion 708 constructed with a non-magnetized ferromagnetic material. The attachment portion 708 can be shaped to receive the device 200. In this embodiment, the attachment portion 708 can be concave to receive a convex major surface of the device 200. The magnet 210 within the device 200 magnetically attaches the device 200 to the ferromagnetic material of the attachment portion 708. When the device 200 is attached to the accessory, the device 200 can be magnetically attached to the interior surface 114 of the sink basin 102, by virtue of the magnetic attraction between the device 200 and the accessory belt 50, to retain the accessory to the sink basin 102.

Each accessory can be constructed of any suitable material or combination of materials such that at least a portion of the accessory has a non-magnetized ferromagnetic material that can be magnetically attracted to the magnetic accessory attachment device containing a magnet. In this way, although each accessory may not by itself be attachable to a sink, the use of the magnetic accessory attachment device as an intermediary permits interchangeable use of accessories with the magnetic accessory attachment device to attach the accessories to a sink.

Although the device and the accessory belt have been described for use with respect to a sink, it will be appreciated that the accessory belt and device could be utilized in other suitable applications such as bath tubs, wash basins, showers, appliances, etc.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A magnetic sink accessory system for use with a sink having interior and exterior surfaces, the magnetic sink accessory system comprising:
    a ferromagnetic accessory belt configured to be disposed at least partially surrounding the exterior surface of the sink, the accessory belt including an elongate flexible band and a plurality of metal pieces, the plurality of metal pieces being non-magnetized and ferritic and connected to and disposed in spaced relation along at least a portion of the flexible band so as to allow for the accessory belt to conform to contours of the exterior surface of the sink;
    an adhesive strip configured to adhere at least some of the plurality of metal pieces to the exterior surface of the sink, the adhesive strip disposed in direct contact with one of the exterior surface of the sink and the flexible band;
    a covering strip disposed over an entire exposed surface of the ferromagnetic accessory belt and any exposed portions of the plurality of metal pieces, the covering strip configured to at least partially adhere to the exterior surface of the sink around the ferromagnetic accessory belt and the plurality of metal pieces; and
    a magnetic accessory attachment device including a body and a magnet disposed within the body such that when the body is in the vicinity of the ferromagnetic accessory belt, the magnet is adapted to draw the body against the interior surface of the sink due to a magnetic attraction between the magnet and the accessory belt.

2. The magnetic sink accessory system of claim 1, wherein the adhesive strip has a first adhesive side adhered to at least one of the plurality of metal pieces and a second adhesive side configured to adhere to the exterior surface of the sink so as to secure the accessory belt to the sink.

3. The magnetic sink accessory system of claim 1, wherein the adhesive strip has a first adhesive side adhered to the flexible band and a second adhesive side configured to adhere to the exterior surface of the sink so as to secure the accessory belt to the sink.

4. The magnetic sink accessory system of claim 1, wherein the flexible band further comprises a first adhesive side adhered to the plurality of metal pieces.

5. The magnetic sink accessory system of claim 1, wherein the covering strip is made from a sealing material so as to substantially prevent moisture from reaching the accessory belt.

6. The magnetic sink accessory system of claim 1, wherein the accessory belt is configured to fully surround the exterior surface of the sink.

7. The magnetic sink accessory system of claim 1, wherein the body of the magnetic accessory attachment device has first and second external surfaces, and wherein the magnet is configured to draw the first external surface against the interior surface of the sink due to the magnetic attraction between the magnet and the accessory belt, and the magnet is configured to draw the second external surface against a non-magnetized ferromagnetic portion of a sink accessory so as to removably attach the magnetic accessory attachment device to the sink accessory.

8. A ferromagnetic accessory belt for use with a sink having interior and exterior surfaces, the ferromagnetic accessory belt comprising:
    an elongate flexible band configured to be disposed at least partially surrounding the exterior surface of the sink;
    a plurality of metal pieces, the plurality of metal pieces being non-magnetized and ferritic and disposed along at least a portion of the flexible band, the flexible band forming a connection between adjacent metal pieces;
    an adhesive strip configured to adhere at least some of the plurality of metal pieces to the exterior surface of the sink, the adhesive strip disposed in direct contact with at least some of the plurality of metal pieces and the exterior surface of the sink;
    a covering strip disposed over an entire exposed surface of the elongate flexible band and any exposed portions of the plurality of metal pieces, the covering strip configured to at least partially adhere to the exterior surface of the sink around the elongate flexible band and the plurality of metal pieces;
    wherein the plurality of metal pieces are disposed in spaced relation to one another so as to adapt the flexible band to conform to contours of the exterior surface of the sink, and wherein the plurality of metal pieces are configured to provide a magnetic attraction to a magnetic accessory attachment device disposed on the interior surface of the sink.

9. The ferromagnetic accessory belt of claim 8, the adhesive strip having a first adhesive side adhered to at least one of the plurality of metal pieces and a second adhesive side configured to adhere to the exterior surface of the sink so as to secure the accessory belt to the sink.

10. The ferromagnetic accessory belt of claim 8, the adhesive strip having a first adhesive side further adhered to a portion of the flexible band and a second adhesive side configured to adhere to the exterior surface of the sink so as to secure the accessory belt to the sink.

11. The ferromagnetic accessory belt of claim 8, wherein the flexible band further comprises a first adhesive side adhered to the plurality of metal pieces.

12. The ferromagnetic accessory belt of claim 8, wherein the covering strip is made from a sealing material so as to substantially prevent moisture from reaching the flexible band and the plurality of metal pieces.

13. The magnetic sink accessory system of claim 1, wherein the plurality of metal pieces are disposed between the flexible band and the adhesive strip.

14. The magnetic sink accessory system of claim 1, wherein the plurality of metal pieces are disposed exterior of the flexible band when the ferromagnetic accessory belt is installed on the sink.

15. The magnetic sink accessory system of claim 11, wherein the plurality of metal pieces are disposed between the flexible band and the adhesive strip.

* * * * *